US010010881B2

(12) United States Patent
Boldor et al.

(10) Patent No.: US 10,010,881 B2
(45) Date of Patent: Jul. 3, 2018

(54) CATALYSTS USEFUL FOR BIOMASS PYROLYSIS AND BIO-OIL UPGRADING

(71) Applicant: Board of Supervisors of Louisiana State University and Agricultural and Mechanical College, Baton Rouge, LA (US)

(72) Inventors: Dorin Boldor, Baton Rouge, LA (US); Daniel Hayes, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 252 days.

(21) Appl. No.: 14/899,451

(22) PCT Filed: Jun. 24, 2014

(86) PCT No.: PCT/US2014/043827
§ 371 (c)(1),
(2) Date: Dec. 17, 2015

(87) PCT Pub. No.: WO2014/209973
PCT Pub. Date: Dec. 31, 2014

(65) Prior Publication Data
US 2016/0144351 A1    May 26, 2016

Related U.S. Application Data

(60) Provisional application No. 62/013,020, filed on Jun. 17, 2014, provisional application No. 61/839,081, (Continued)

(51) Int. Cl.
*B01J 37/02* (2006.01)
*B01J 37/12* (2006.01)
(Continued)

(52) U.S. Cl.
CPC .......... *B01J 37/0225* (2013.01); *B01J 23/42* (2013.01); *B01J 35/0033* (2013.01); (Continued)

(58) Field of Classification Search
CPC ... B01J 23/42; B01J 29/40; B01J 31/00; B01J 35/0033; B01J 35/023; B01J 37/0209; (Continued)

(56) References Cited

U.S. PATENT DOCUMENTS

| | | | |
|---|---|---|---|
| 6,987,079 B2 | 1/2006 | Wormsbecher | 502/172 |
| 7,255,726 B2 | 8/2007 | Ma et al. | 96/56 |

(Continued)

OTHER PUBLICATIONS

Adam, J. et al., "Pyrolysis of biomass in the presence of Al-MCM-41 type catalysts," Fuel, vol. 84, No. 12-13, pp. 1494-1502 (2005).
(Continued)

*Primary Examiner* — Renee Robinson
*Assistant Examiner* — Derek N Mueller
(74) *Attorney, Agent, or Firm* — John H. Runnels

(57) ABSTRACT

Catalysts useful in transforming biomass to bio-oil are disclosed, as are methods for making such catalysts, and methods of transforming biomass to bio-oil. The catalysts are especially useful for, but are not limited to, microwave- and induction-heating based pyrolysis of biomass, solid waste, and other carbon containing materials into bio-oil. The catalysts can also be used for upgrading the bio-oil to enhance fuel quality.

7 Claims, 27 Drawing Sheets

Temperature Profiles at Different Power Levels

Related U.S. Application Data filed on Jun. 25, 2013, provisional application No. 61/838,565, filed on Jun. 24, 2013.

(51) Int. Cl.

| | |
|---|---|
| *B01J 35/00* | (2006.01) |
| *B01J 23/42* | (2006.01) |
| *C10B 53/02* | (2006.01) |
| *C10B 57/06* | (2006.01) |
| *C10K 3/02* | (2006.01) |
| *C10G 1/08* | (2006.01) |
| *B01J 35/02* | (2006.01) |
| *B01J 29/40* | (2006.01) |
| *C10B 19/00* | (2006.01) |
| *B01J 37/16* | (2006.01) |
| *B01J 31/00* | (2006.01) |

(52) U.S. Cl.
CPC ....... *B01J 37/0209* (2013.01); *B01J 37/0217* (2013.01); *B01J 37/0219* (2013.01); *B01J 37/0246* (2013.01); *C10B 53/02* (2013.01); *C10B 57/06* (2013.01); *C10G 1/086* (2013.01); *C10K 3/02* (2013.01); *B01J 29/40* (2013.01); *B01J 31/00* (2013.01); *B01J 35/023* (2013.01); *B01J 37/16* (2013.01); *C10B 19/00* (2013.01); *Y02E 50/14* (2013.01)

(58) Field of Classification Search
CPC B01J 37/0217; B01J 37/0219; B01J 37/0225; B01J 37/0246; B01J 37/16; C10B 19/00; C10B 53/02; C10B 57/06; C10G 1/086; C10K 3/02; Y02E 50/14
See application file for complete search history.

(56) References Cited

U.S. PATENT DOCUMENTS

| | | | |
|---|---|---|---|
| 7,387,712 B2 | 6/2008 | Purta et al. | 204/157.15 |
| 2006/0091499 A1 | 5/2006 | Stecker et al. | 438/57 |
| 2013/0213795 A1 | 8/2013 | Strohm et al. | 204/157.15 |

OTHER PUBLICATIONS

Adjaye, J.D. et al., "Production of hydrocarbons by catalytic upgrading of a fast pyrolysis bio-oil. Part I: Conversion over various catalysts," Fuel Processing Technology, vol. 45, No. 3, pp. 161-183 (1995).

Adjaye, J.D. et al., "Production of hydrocarbons by catalytic upgrading of a fast pyrolysis bio-oil. Part II: Comparative catalyst performance and reaction pathways," Fuel Processing Technology, vol. 45, No. 3, pp. 185-202 (1995).

Aguado, R. et al., "Pyrolysis of sawdust in a conical spouted bed reactor. Yields and product composition," Industrial & Engineering Chem. Res., vol. 39, No. 6, pp. 1925-1933 (2000).

Borges, F.C. et al., "Fast microwave assisted pyrolysis of biomass using microwave absorbent," Bioresource Technology, vol. 156, pp. 267-274 (2014).

Bu, Q. et al., "Production of phenols and biofuels by catalytic microwave pyrolysis of lignocellulosic biomass," Bioresource Technology, vol. 108, pp. 274-279 (2012).

He, C. et al., "Synthesis and characterization of Pd/ZSM-5/MCM-48 biporous catalysts with superior activity for benzene oxidation," Applied Catalysis A: General, vol. 382, No. 2, pp. 167-175 (2010).

Hedlund, J. et al., "The synthesis and testing of thin film ZSM-5 catalysts," Chemical Engineering Science, vol. 59, No. 13, pp. 2647-2657 (2004).

Lee, M.K. et al., "Pyrolysis of napier grass in an induction-heating reactor," Journal of Analytical and Applied Pyrolysis, vol. 88, No. 2 pp. 110-116 (2010).

Lei, H. et al., "Microwave pyrolysis of distillers dried grain with solubles (DDGS) for biofuel production," Bioresource Technology, vol. 102, pp. 6208-6213 (2011).

Louis, B. et al., "Synthesis of ZSM-5 coatings on stainless steel grids and their catalytic performance for partial oxidation of benzene by $N_2O$," Applied Catalysis A: General, vol. 210, No. 1-2, pp. 103-109 (2001).

Nguyen, T. S. et al., "Catalytic upgrading of biomass pyrolysis vapours using faujasite zeolite catalysts," Biomass and Bioenergy, vol. 48, pp. 100-110 (2013).

Öhrman, O. et al, "Synthesis and evaluation of ZSM-5 films on cordierite monoliths," Applied Catalysis A: General, vol. 270, No. 1-2, pp. 193-199 (2004).

Ren, S. et al., "Biofuel production and kinetics analysis for microwave pyrolysis of Douglas fir sawdust pellet," Journal of Analytical and Applied Pyrolysis, vol. 94, pp. 163-169 (2012).

Seijger, G.B.F. et al., "In situ synthesis of binderless ZSM-5 zeolitic coatings on ceramic foam supports," Microporous and Mesoporous Materials, vol. 39, No. 1-2, pp. 195-204 (2000).

Tian, Y. et al., "Estimation of a novel method to produce bio-oil from sewege sludge by microwave pyrolysis with the consideration of efficiency and safety," Bioresource Technology, vol. 102, pp. 2053-2061 (2011).

Tsai, W.T. et al., "Fast pyrolysis of rice husk: Product yields and compositions," Bioresource Technology, vol. 98, No. 1, pp. 22-28 (2006).

Yang, G. et al., "Preparation, characterization and reaction performance of H-ZSM-5/cobalt/silica capsule catalysts with different sizes for direct synthesis of isoparaffins," Applied Catalysis A: General, vol. 329, pp. 99-105 (2007).

Zhang, Q. et al., "Review of biomass pyrolysis oil properties and upgrading research," Energy Conversion and Management, vol. 48, No. 1, pp. 87-92 (2007).

Zhou, R. et al., "Effects of reaction temperature, time and particle size on switchgrass microwave pyrolysis and reaction kinetics," International Journal of Agricultural and Biological Engineering, vol. 6, No. 1, pp. 53-61 (2013).

CATALYSTS USEFUL FOR BIOMASS PYROLYSIS AND BIO-OIL UPGRADING

This is the United States national stage of international application PCT/US2014/043827, international filing date Jun. 24, 2014, which claims the benefit of the Jun. 24, 2013 filing date of U.S. provisional patent application Ser. No. 61/838,565; and of the Jun. 25, 2013 filing date of U.S. provisional application Ser. No. 61/839,081; and of the Jun. 17, 2014 filing date of U.S. provisional application Ser. No. 62/013,020 under 35 U.S.C. § 119(e). The complete disclosures of all three priority applications are hereby incorporated by reference in their entirety.

The development of this invention was partially funded by the United States Government under grant number CBET-1258821 awarded by the National Science Foundation. The United States Government has certain rights in this invention.

TECHNICAL FIELD

This invention pertains to catalysts useful in transforming biomass to bio-oil, methods for making such catalysts, and methods of transforming biomass to bio-oil.

BACKGROUND

Energy consumption in the United States alone was 97.7 quads in 2011 and is projected to rise to 102.3 quads by 2025 and to 107.6 quads by 2040. (1 quad≈$10^{18}$ Joule.) The amount of energy derived from fossil fuels (petroleum, natural gas, and coal) is estimated to be ~80% of total energy consumption. There is an unfilled need for alternative and renewable energy sources. Biomass is both renewable and abundant. Ample supplies of agricultural and forestry residues could potentially be converted into usable energy sources. In the United States alone the annual availability of unused wood residues from logging and thinning is estimated to be ~97 million dry tons.

Since the 1970's, research has focused on various ways for upgrading lignocellulosic biomass into fuels and other industrially valuable chemicals. The two most common methods for converting biomass to usable energy sources are: (i) biochemical conversion, such as anaerobic digestion and fermentation, and (ii) thermochemical conversion, such as incineration, gasification, and pyrolysis. Thermochemical conversion technologies are usually preferred because they are more easily implemented into the existing energy infrastructure. Pyrolysis, a thermochemical process, has received considerable attention, not only as a precursor to combustion and gasification processes, but also as an independent process in its own right.

Pyrolysis creates high-energy products with numerous potential uses. Pyrolysis is energy-efficient, and it can be self-sustaining. However, pyrolysis is still in the early developmental stage. Further research and development are needed to make pyrolysis competitive with other renewable energy technologies.

Pyrolysis Overview

Biomass pyrolysis is the thermochemical decomposition of biomass at elevated temperatures, in the absence of significant levels of oxygen gas. As the biomass is heated it decomposes into volatile vapors, which are then rapidly condensed to form "bio-oil." The remaining products are char and non-condensable gases. Each of these products has numerous applications. The char can be used to amend soils; it may be converted into activated carbon, or it may be used in a carbon-based catalyst. The excess non-condensable gas primarily comprises combustible gases such as $H_2$, CO, $C_2H_2$, $CH_4$, etc. These gases can optionally be redirected to supply energy to drive the pyrolysis process itself. Finally, the liquid bio-oil can be upgraded via for use as a hydrocarbon fuel or other industrial chemical. "Upgrading" typically implies hydrogenation or hydrodeoxygenation; but it can also include catalytic cracking to alter the relative mixture of products, as is often done when refining conventional petroleum.

Bio-oil is the most value product of pyrolysis. It results from the depolymerization and fragmentation of biomass feedstock components (e.g., cellulose, hemicellulose, and lignin) during pyrolysis. Bio-oil is a complex mixture of different sized (mostly relatively large) organic molecules such as phenols, furans, levoglucosan, and other compounds. Nearly all species of oxygenated organics are present in bio-oil, including aldehydes, ketones, alcohols, ethers, esters, phenols, carboxylic acids, etc. The molecules that compose the bio-oil liquid are generally highly oxygenated.

The yield and characterization of pyrolysis products are based on feedstock composition and reaction conditions. For example, there is a higher yield of non-condensable gases when pyrolysis is conducted at higher temperatures and longer residence times. There is higher yield of bio-oil at higher temperatures and shorter residence times; and there is more char at lower temperatures and shorter residence time.

Microwave Heating Overview

Microwave heating generates heat within materials, in contrast to conventional heating, which heats the surface of materials. Conventional methods use conduction, convection, or radiation; and the resulting surface temperature is substantially greater than the core temperature. Heat transfer from the surface of the material to the center is slow and inefficient. Microwaves are electromagnetic radiation that can generate heat via the interaction of a molecular dipole with the alternating electric field. (Microwaves are generally defined as having wavelengths between ~1 mm and ~1 m, corresponding to frequencies from ~300 MHz to ~300 GHz.) By converting the electromagnetic field into heat, the material can be heated both at its core and at its surface. Depending on the details of a particular configuration, in some cases the core temperature can even exceed the surface temperature. Microwave irradiation permits rapid, more uniform, and more selective heating. The conversion efficiency of microwave energy into heat is high, typically ~80%-85%.

The effect of microwaves on a material depends on the dielectric properties of the material; not all materials react similarly. There are three principal ways in which material can interact with the electric part of a microwave field: (i) as an insulator that is microwave-transparent, through which microwaves pass with little loss, (ii) as a conductor that reflects microwaves and thus blocks microwaves from passing through the material, and (iii) as an absorber of microwave energy.

Microwave-Assisted Pyrolysis

The dry biomass that is typically used in pyrolysis reactions tends to be a microwave insulator, with poor absorbing properties. In practice, dry biomass typically does not absorb enough microwave energy to heat to an effective pyrolysis temperature. Therefore microwave-assisted pyrolysis usually depends on heating a microwave absorber, e.g., char, a catalyst, or activated carbon. In a mixture of biomass with a microwave absorber, microwaves are first absorbed primarily by the microwave absorber, which then conducts heat to the biomass for the latter to reach pyrolysis temperatures.

Inverted heat transfer and high temperature can be achieved with microwave-assisted pyrolysis. However, microwave-assisted pyrolysis has been slow to be commercialized due to the cost of existing techniques. There is an unfilled need for more efficient, less expensive methods of conducting microwave-assisted pyrolysis. Previous studies have primarily been conducted with a batch or semi-batch process; few have been conducted as a continuous process.

Ren, S. et al., "Biofuel Production and Kinetics Analysis for Microwave Pyrolysis of Douglas Fir Sawdust Pellet," J. of Analytical and Applied Pyrolysis, Vol. 94, pp. 163-169 (2012) investigated the impact of reaction temperature and residence time on product yields from microwave-induced pyrolysis of Douglas fir sawdust pellets. The results showed that, in general, bio-oil and syngas yields increased with increasing temperatures and longer residence times. The chemical composition of the bio-oil and syngas were found to be highly dependent on reaction temperature.

Borges, F. C. et al., "Fast Microwave Assisted Pyrolysis of Biomass Using Microwave Absorbent," Bioresource Tech., Vol. 156, pp. 267-274 (2014) reported fast microwave-assisted pyrolysis of biomass mixed with a microwave absorber.

Zhou, R. et al. "Effects of reaction temperature, time and particle size on switchgrass microwave pyrolysis and reaction kinetics." *International Journal of Agricultural and Biological Engineering* vol. 6, pp. 53-61 (2013) investigated the effect of reaction temperature, residence time, and particle size on microwave pyrolysis of switchgrass. The authors concluded that thermochemical reactions can take place rapidly via microwave pyrolysis in materials having large particle sizes. Thus feedstock grinding may not be necessary for microwave pyrolysis.

Bu, Q. et al., "Production of Phenols and Biofuels by Catalytic Microwave Pyrolysis of Lignocellulosic Biomass," Bioresource. Tech., Vol. 108, pp. 274-279 (2012) studied the effect of microwave absorbers on catalytic microwave pyrolysis, and concluded that adding activated carbon had a significant impact on phenols in the bio-oil product.

Lei, H., et al., "Microwave pyrolysis of distillers dried grain with solubles (DDGS) for biofuel production," Bioresource technology, vol. 102, pp. 6208-6213 (2011) studied bio-oil production by microwave pyrolysis of distillers' dried grain. About 13 wt % of the bio-oil, without upgrading, had the same hydrocarbon composition as unleaded gasoline.

Tian, Y. et al., "Estimation of a Novel Method to Produce Bio-Oil from Sewage Sludge by Microwave Pyrolysis with the Consideration of Efficiency and Safety," Biores. Tech., Vol. 102, pp. 2053-2061 (2011) investigated microwave absorbers for the microwave-assisted pyrolysis of sewage sludge. Different microwave absorbers (graphite, residue char, active carbon, or silicon carbide) were mixed with sewage sludge feedstocks. Each was shown to alter reaction conditions, which in turn affected product yields and characteristics.

Induction Heating Overview

Induction heating is a contactless heating method in which an alternating voltage is applied to an induction heating coil. The coil contains a conductive material arranged in a series of loops. Applying an alternating voltage creates an alternating magnetic field on the load (the loops of conductive material), which in turn produces heat via eddy currents and magnetic hysteresis. Eddy currents oppose the applied magnetic field and are the primary source of heat for induction heating. Magnetic hysteresis creates additional heat in ferromagnetic materials. The advantages of an induction heating system are rapid heating due to high power densities, high energy efficiency, and accurately controlled heating. Induction heating has potential use in bio-oil production because these characteristics can help generate high liquid yields from pyrolysis.

Tsai, W. T. et al., "Fast Pyrolysis of Rice Husk: Product Yields and Compositions," Bioresource Tech., Vol. 98, no. 1, pp. 22-28 (2006) reported the use of induction heating for fast pyrolysis of rice husks. The resulting pyrolytic oil was a complex mixture of aromatic and carbonyl compounds. Similar experiments were performed with sugarcane bagasse and coconut shells with the same tubular reactor. The resulting liquid yields were similar, but up to 65% of the liquid yield was water, due both to high water content in the feedstock and to dehydration reactions that occurred during pyrolysis.

Other experiments have used induction heat for pyrolysis of Napier grass, a non-foraged grass. Lee, M. K. et al., "Pyrolysis of Napier Grass in an Induction-Heating Reactor," J. of Analytical and Applied Pyrolysis, Vol. 88, no. 2, pp. 110-116 (2010) reported that high concentrations of water and oxygenated compounds in the liquid fraction meant that further processing would be needed before the produced bio-oils could be used as fuels.

Induction Upgrading

Pyrolysis bio-oil is produced by rapidly heating biomass at a very high temperature in anoxic conditions, followed by rapid quenching. The initial condensate is thermodynamically unstable. The thermodynamically unstable product tends to move towards thermodynamic equilibrium during storage, resulting in polymerization and repolymerization reactions, which increase the product's viscosity and reduce its heating value.

Other factors limiting the use of bio-oil produced by fast pyrolysis include its high oxygen content, high acidity, and high ash content. Pyrolysis bio-oil typically has an oxygen content of about 40%, compared to less than 1% in conventional hydrocarbon fuels. A high oxygen content means the energy density can be up to 50% lower, and it can also make the bio-oil immiscible with other hydrocarbon fuels. To overcome these problems, bio-oil is usually "upgraded" before the bio-oil is refined. "Upgrading" typically involves one or more of the following: removal of water, hydrodeoxygenation, thermocatalytic cracking, emulsification, and steam reforming. Existing upgrading catalysts perform poorly with bio-oils due to active site poisoning, and re-polymerization of bio-oil constituents that block the catalyst pores.

Both thermocatalytic cracking and hydrodeoxygenation reduce the oxygen content of the bio-oil. In the past, these techniques have typically required complicated and sophisticated equipment, which increases the processing costs. Catalyst deactivation and reactor clogging also add to the cost.

Another method for upgrading pyrolysis bio-oil is emulsification of the bio-oil with conventional diesel. Since bio-oil and conventional hydrocarbon fuels are immiscible, they are combined by emulsification using surfactants. Interestingly, the emulsions tend to be more stable than bio-oil alone. In addition, the viscosity of the emulsion is typically lower than that of the bio-oil alone. However, the production cost is higher, and emulsification does not solve other problems such as corrosiveness.

Catalytic Cracking Overview

Catalytic cracking is an effective way to reduce the oxygen content of bio-oil. Pyrolysis vapors from the thermochemical decomposition of biomass are passed over a hot catalyst bed. Deoxygenation reactions on the catalyst surface break higher molecular weight compounds down to lower molecular weight hydrocarbons, and oxygen is released—primarily as water, $CO_2$, and CO.

A disadvantage of existing pyrolysis upgrading methods is that coke tends to deposit on the catalyst, leading to catalyst deactivation and non-uniform heating. Non-uniform, cooler temperature zones can lead to repolymerization reactions on catalyst surfaces, while hotspots favor higher gas yields. Conventional heating methods are not energy efficient, they have slower heating and cooling rates, and they tend to produce temperature gradients (non-uniform temperature distributions). In conventional methods, the catalyst bed is heated by a carrier such as sand, or by heat exchangers that surround the bed. The temperature is maintained by a cooler fluid that absorbs excess heat. Heat loss can be significant during energy transfer from the carrier or heat exchanger to the catalyst, and then to the coolant.

Adam, J. et al., "Pyrolysis of Biomass in the Presence of Al-MCM-41 Type Catalysts," Fuel, Vol. 84, no. 12-13, pp. 1494-1502 (2005) reported the effect of three different catalysts with enlarged pores on bio-oil composition (Al-MCM-41, Cu/Al-MCM-41, and Al-MCM-41). The authors observed that the compositions of the resulting bio-oils differed significantly. Levoglucosan was eliminated, while furan, aromatics, and acetic acid increased.

Adjaye, J. D. et al., "Production of Hydrocarbons by Catalytic Upgrading of a Fast Pyrolysis Bio-Oil. Part II: Comparative Catalyst Performance and Reaction Pathways," Fuel Proc. Tech., Vol. 45, no. 3, pp. 185-202 (1995) studied the effect of five catalysts: HZSM-5, H-Y, H-mordenite, silicate and silica alumina. HZSM-5 produced the highest hydrocarbon yield. The results suggested that bio-oil conversion can follow different pathways: thermal or thermocatalytic. The thermal pathway breaks down high molecular weight compounds into lighter fractions. The thermocatalytic pathway produces coke, gas, and water, and higher levels of aromatic compounds.

Aguado, R. et al., "Pyrolysis of Sawdust in a Conical Spouted Bed Reactor. Yields and Product Composition," Industrial & Engineering Chem. Res., Vol. 39, no. 6, pp. 1925-1933 (2000) reported that in situ catalytic flash pyrolysis increased the gas and char yield and decreased the liquid yield. Also, $CO_2$ yield decreased and $C_4$ yield increased significantly. ("$C_4$" generically denotes all 4-carbon hydrocarbons, including n-butane, isobutene, 1-butene, (Z)-2-butene, (E)-2-butene, butadiene, etc.)

Nguyen, T. S., et al., "Catalytic upgrading of biomass pyrolysis vapours using faujasite zeolite catalysts," Biomass and bioenergy, vol. 48, pp. 100-110 (2013) studied the effect of a Faujasite zeolite catalyst on biomass pyrolysis. They reported that the resulting upgraded bio-oil vapors had superior fuel quality as compared to that produced by in situ catalytic upgrading. Char, water, and gas yields all increased, while liquid yield decreased. The upgraded bio-oil was richer in aromatic compounds. An $Na_{0.2}H_{0.8}$-FAU catalyst was most effective in oxygen removal. Catalyst upgrading also reduced levels of aldehydes, ketones, and acids, which increased the energy content of the oil.

Platinum's hydrodeoxygenating catalytic properties make it useful in many applications, such as the removal of trans fatty acids in cottonseed oil via hydrogenation, the electroreduction of oxygen in fuel cells, and the hydrodechlorination of tetrachloromethane.

Adjaye, J. D. et al., Production of Hydrocarbons by Catalytic Upgrading of a Fast Pyrolysis Bio-Oil. Part II: Comparative Catalyst Performance and Reaction Pathways," Fuel Processing Tech., Vol. 45, no. 3, pp. 185-202 (1995) reported that zeolites such as HZSM-5 are among the most effective catalysts in deoxygenating bio-oil.

ZSM-5 and other zeolite catalysts have been deposited as conformal thin film coatings. For example, Louis, B. et al., Synthesis of ZSM-5 coatings on stainless steel grids and their catalytic performance for partial oxidation of benzene by $N_2O$. Applied Catalysis A: General 2001, 210 (1-2), 103-109 described hydrothermal reactions over ZSM-5 on a stainless steel grid.

Seijger, G. B. F. et al., In situ synthesis of binderless ZSM-5 zeolitic coatings on ceramic foam supports. Microporous and Mesoporous Materials 2000, 39 (1-2), 195-204 described hydrothermal reactions over ZSM-5 on ceramic foams.

Hedlund, J. et al., The synthesis and testing of thin film ZSM-5 catalysts. Chemical Engineering Science 2004, 59 (13), 2647-2657 described hydrothermal reactions over ZSM-5 on silica and alumina supports.

He, C. et al., Synthesis and characterization of Pd/ZSM-5/MCM-48 biporous catalysts with superior activity for benzene oxidation. Applied Catalysis A: General 2010, 382 (2), 167-175 described the growth of Pd-doped ZSM-5 onto MCM-48 via a simple overgrowth method.

Öhrman, O. et al., Synthesis and evaluation of ZSM-5 films on cordierite monoliths. Applied Catalysis A: General 2004, 270 (1-2), 193-199 described a seeded hydrothermal growth method using silicalite-1 seeds supported on cordierite to form ZSM-5 films.

Yang, G. et al., Preparation, characterization and reaction performance of H-ZSM-5/cobalt/silica capsule catalysts with different sizes for direct synthesis of isoparaffins. Applied Catalysis A: General 2007, 329 (0), 99-105 described the hydrothermal synthesis of an H-ZSM-5 catalyst supported on a cobalt-silica pellet. The authors reported that the core size and morphology substantially affected the thickness and crystal structure growth of ZSM layer. The authors also reported a correlation between size and conversion efficiency: Smaller sized pellets resulted in higher conversion rates. The authors speculated that the core morphology could affect catalyst structure morphology to such a degree that reaction selectivity might be altered.

Adjaye, J. D. and Bakhshi, N. N., Production of hydrocarbons by catalytic upgrading of a fast pyrolysis bio-oil. Part I: Conversion over various catalysts. Fuel Processing Technology 1995, 45(3), 161-183 discloses the use of zeolite catalysts, including HZSM-5, in the pyrolytic production of bio-oil.

Zhang, Q.; Chang, J.; et al., Review of biomass pyrolysis oil properties and upgrading research. Energy Conversion and Management 2007, 48(1): 87-92 discloses the use of metal/metal oxide catalysts to convert smaller oxygenates to higher molecular weight compounds containing less oxygen, and simultaneously to deoxygenate phenols.

There remains an unfilled need for improved methods for making bio-oil from biomass, for improved catalysts that are useful in such transformation reactions, and for improved methods for making such catalysts.

DISCLOSURE OF THE INVENTION

We have discovered improved catalysts that are useful in transforming biomass to bio-oil, improved methods for making such catalysts, and improved methods of transforming biomass to bio-oil using the catalysts. The catalysts are especially useful for, but are not limited to, microwave- and induction-heating based pyrolysis of biomass, solid waste, and other carbon-containing materials into bio-oil. The catalysts can also be used for upgrading the bio-oil to enhance its fuel quality.

The novel method inhibits the poisoning of catalytically active sites, and inhibits repolymerization of products. The heat flux between catalyst and reactants is "inverted," meaning that the surface of the catalyst is hotter than the surrounding gases. The inverted heat flux causes molecules to tend to move away from the catalyst surface, rather than depositing on or bonding to that surface.

In a preferred embodiment, pyrolysis is carried out as a continuous process (although batch mode may also be used). The biomass may be mixed with catalyst particles, or it may pass over a catalyst bed. The catalyst is heated by microwave or induction heating, and the catalyst rapidly heats the biomass to a temperature from about 250° C. to about 1000° C., preferably from about 500° C. to about 700° C., in anoxic conditions. The biomass volatilizes into vapors. These vapors can be reheated conductively by the catalyst itself (rather than the other way around, as happens in many prior catalytic methods). The vapors are then condensed into a liquid bio-oil. The preferred system uses an "inverse" thermal flux; i.e., heat is generated directly at the catalyst surface or the surface of the substrate supporting the catalyst, which promotes uniform temperature of the catalyst and helps to reduce catalyst degradation and fouling. Microwave or induction heating increases the mass transfer rate at the catalyst surface, by creating surface currents and heat transfer gradients that preferentially remove products from the catalytic surface, thus making the surface available for new reactants. Even before any "upgrading" occurs, the bio-oil that is initially produced should be more stable during storage.

Heat transfer in previous approaches has generally been limited by the rate of transfer from electrically- or gas-heated reactor walls to the biomass. Efficient bio-oil production in such a system requires small particle sizes, on the order of 1-2 mm, for reasonable heat transfer rates. Or when microwave heating has previously been used, uneven heating from the uneven electric field distribution has typically caused non-uniform heating. In a preferred embodiment of the new process, a focusing microwave reactor concentrates the microwave energy in the location(s) of the cavity where unreacted biomass is located. Much larger particle sizes may be used in the new process, up to several cm in diameter (e.g., up to: 5 mm, 1 cm, 2 cm, 3 cm, 4 cm, 5 cm, 8 cm, or 10 cm), as heating occurs throughout the volume of the material with microwave heating, or as heating occurs at multiple heating surfaces with induction heating. The use of supported metal and ceramic catalysts enhances the efficiency of bio-oil production and bio-oil quality. Small scale (e.g., ~100 μm to ~5 mm, preferably ~1 mm) supports in the form of metallic balls, rods, mesh or foam are coated with a layer (e.g., a nanoscale layer) or metal, metal oxide, or ceramic catalyst. In a preferred approach, the catalyst/support combination is formed through a self-assembly, seed/growth mechanism.

Biomass pyrolysis using induction heat has previously employed high frequency induction heating, generally above 150 kHz; by contrast, in the novel method low frequency induction heating is preferred, below about 100 kHz. Low frequency induction is preferred when heating larger particle sizes because low frequency penetration depth is greater, leading to more efficient and uniform heating. Induction heating occurs within the walls of the reactor or on another metal surface inside the reactor, e.g., an auger.

A thermocouple such as a K-type thermocouple may be used to regulate the reactor's operating temperature. However, it is preferred to use an infrared control system to give more precise and rapid temperature readouts directly from the interior of the reactor. (Thermocouples do not operate well in the presence of microwave or induction fields.)

Preliminary studies show that the water content of the bio-oil product produced by the present invention is relatively low (~35-40%), where previous reports have described a substantially higher water content (e.g., ~65%).

The present invention may be used to convert biomass to bio-oil in either a batch mode or a continuous mode. The present invention is well-suited for continuous flow of biomass through a microwave- or induction-heated reactor, for example using an auger or a piston.

MODES FOR CARRYING OUT THE INVENTION

Methods

Abbreviations

Figure 1:
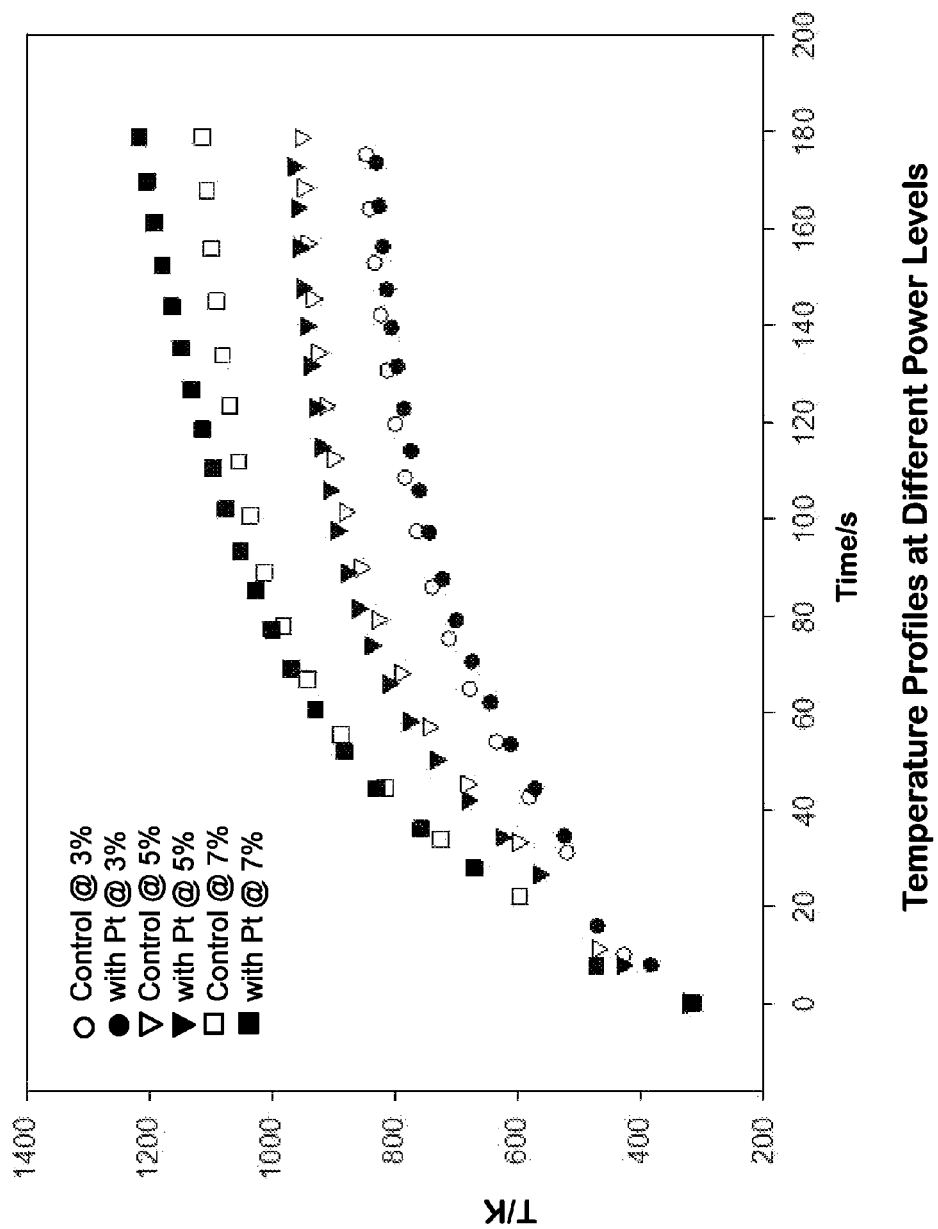
FIG. 1 depicts temperature plots for the heating of stainless steel particles, both with and without surface-deposited Pt.

| | |
|---|---|
| B/C ratio | Biomass-to-catalyst ratio |
| BTEX | Benzene, toluene, ethyl benzene, and xylene |
| CEL | Cellulose |
| CHN | Carbon, hydrogen, and nitrogen |
| CTT | Chinese tallow tree biomass |
| EDS | Electron Dispersive X-ray Spectroscopy |
| FTIR | Fourier Transform Infrared Spectroscopy |
| GC | Gas chromatography |
| MS | Mass spectroscopy |
| PSW | Pine sawdust |
| SEM | Scanning Electron Microscopy |
| XPS | X-ray Photoelectron Spectroscopy |
| XRD | X-ray Diffraction Spectroscopy |

Example 1. Catalyst/Substrate Production

A Pt-stainless steel substrate was produced by chemically reducing Pt(s) from platinum salt onto the surfaces of stainless steel particles. The deposition process used formaldehyde as the reducing agent, sodium hydroxide as a stabilizing agent, and chloroplatinic acid hexahydrate solution as the platinum source.

Stainless steel particles (type 316, diameter 4.8 mm) were first washed with deionized water and ethanol, and then dried in an oven at ~100° C. The surface of the stainless steel was then plasma-oxidized for 30 sec in vacuum, chemically converting the metal surface into its oxide. This primed the surface for coupling with a silane linker, which acted as a coupling agent between organic and inorganic materials. The silane linker was formed by hydrolyzing alkoxy groups in the molecule to form a silanol. The hydroxyl groups were then hydrogen-bonded to the substrate, releasing water molecules.

The silane linker used in an initial prototype was a thiol-functionalized silane, mercaptomethyl methyl diethoxy silane ($C_6H_{16}O_2SSi$), purchased from Gelest, Inc.; it was applied following the manufacturer's instructions. After the stainless steel particle surfaces had been oxidized, the particles were submerged in a 2% silane solution (95% ethanol solvent) and agitated for about 2 to 3 min. The solution was decanted, and the particles were rinsed with ethanol. They were either dried overnight at room temperature, or dried for 15 minutes in a 100-150° C. oven. This process was repeated using stainless steel foil to run Fourier Transform Infrared Spectroscopy (FTIR) to confirm silane bonding to the stainless steel surface.

Peaks for Si—O-metal (1000-900 cm$^{-1}$), Si—O—Si (1130-1000 cm$^{-1}$), Si—CH$_3$ (1275-1245 cm$^{-1}$), C—H (3000-2700 cm$^{-1}$), and some O—H (3000-3500 cm$^{-1}$) were observed. The S—H peak was relatively weak and difficult to detect.

The silanized stainless steel particles were then submerged in a gold nanoparticle solution for seeding. The energetically favorable adsorption of thiol to Au nanoparticles created nucleation sites for potential Pt growth. The steel particles were agitated in the Au nanoparticle solution for a few minutes and then left overnight. The next day, the solution was decanted; and the particles were rinsed gently with deionized water and dried in an oven.

A 20 mM aqueous solution of $H_2PtCl_6$ was prepared and mixed with the stainless steel balls. The pH was raised to ~12 with 0.1 M sodium hydroxide. The solution was then heated to approximately 90° C. with vigorous stirring. Then excess formaldehyde (36.5%) was added at a 10:1 molar ratio relative to $PtCl_4^{-2}$. The solution changed color as the platinum was reduced.

The platinum-functionalized steel particles were then cleaned as otherwise outlined in Tang, Xiaolan et al, "Structural Features and Catalytic Properties of Pt/CeO$_2$ Catalysts Prepared by Modified Reduction-Deposition Techniques," Catalysis Letters 4$^{th}$ Ser., Vol. 97, no. 3, pp. 163-170 (2004), and the particles were then rinsed with hot deionized water until the filtrate tested negative with 0.1 M silver nitrate solution (i.e., no silver chloride precipitation was observed); followed by overnight heating in oven at 150° C. The stainless steel balls were then allowed to cool before they were used in the induction heater.

In an alternative embodiment, H-ZSM-5 catalyst-coated particles were prepared by modifying the methods for producing conformal coatings on stainless steel and cobalt-silicon substrates as described by Louis, B. et al., Synthesis of ZSM-5 coatings on stainless steel grids and their catalytic performance for partial oxidation of benzene by N2O. *Applied Catalysis A: General* 2001, 210 (1-2), 103-109; and Aboul-Gheit, A. K. et al., Effect of hydrochlorination and hydrofluorination of Pt/H-ZSM-5 and Pt—Ir/H-ZSM-5 catalysts for n-hexane hydroconversion. *Applied Catalysis A: General* 2008, 334 (1-2), 304-310. The coating methods employed low-temperature, hydrothermal synthesis of sol-gels. Briefly, stainless steel or cobalt substrates were cleaned and plasma-oxidized as otherwise described above. After the plasma oxidation step, the particles were transferred to a silane solution to form a monolayer interface coating. After the monolayer had formed, the particles were washed in ethanol, and then transferred to a solution of TEOS, TPA, and AIP for the formation of the sol-gel. Following gel formation the reaction mixture was heated for 24-48 hours to promote H-ZSM-5 formation. The coatings are characterized by electron microscopy, x-ray photoelectron spectroscopy, x-ray diffraction and optical emission spectroscopy to confirm morphology, crystal structure and metal composition. As another alternative, platinum-substituted versions are prepared by ion exchange, by analogy to the ion-exchange procedure described in Aboul-Gheit, A. K. et al. (2008).

Example 2. Catalyst Analysis After Induction Heating

The platinum-functionalized stainless steel balls were heated with an induction heater at a higher frequency (~150 to ~400 kHz) at three different power levels: 150 W (3%), 250 W (5%) and 350 W (7%). Thermal characteristics were compared to those of untreated stainless steel balls. Three stainless steel balls (functionalized or untreated) were placed in a ceramic crucible and heated inside the induction coil during each run.

Temperature plots compared steel balls with Pt to steel balls without Pt at three power levels: 3%, 5%, and 7% (output=5 kW), as a function of time. As illustrated in FIG. 1, only minor differences in temperature profiles were observed; the platinum deposition did not substantially alter the temperature reached by the stainless steel balls when heated with an induction coil. The temperature profiles were fitted to a simple exponential curve, with three parameters ($T_0$, a, and b):

$$T(K) = T_0 + a*(1 - b^{t(s)})$$

The heating parameters and maximum steady state temperatures reached at different conditions are listed in Table 1.

TABLE 1

Induction heater parameters.

| Power (W) | Frequency (kHz) | Current (A) | Voltage (V) | Max Steady State Temperature (K) | |
|---|---|---|---|---|---|
| | | | | Control | w/Pt |
| 150 [3%] | 335 | 21 | 70 | 815 ± 23 | 798 ± 24 |
| 250 [5%] | 333 | 23 | 86 | 926 ± 22 | 941 ± 19 |
| 350 [7%] | 331 | 25 | 104 | 1083 ± 22 | 1152 ± 43 |

Figure 2:
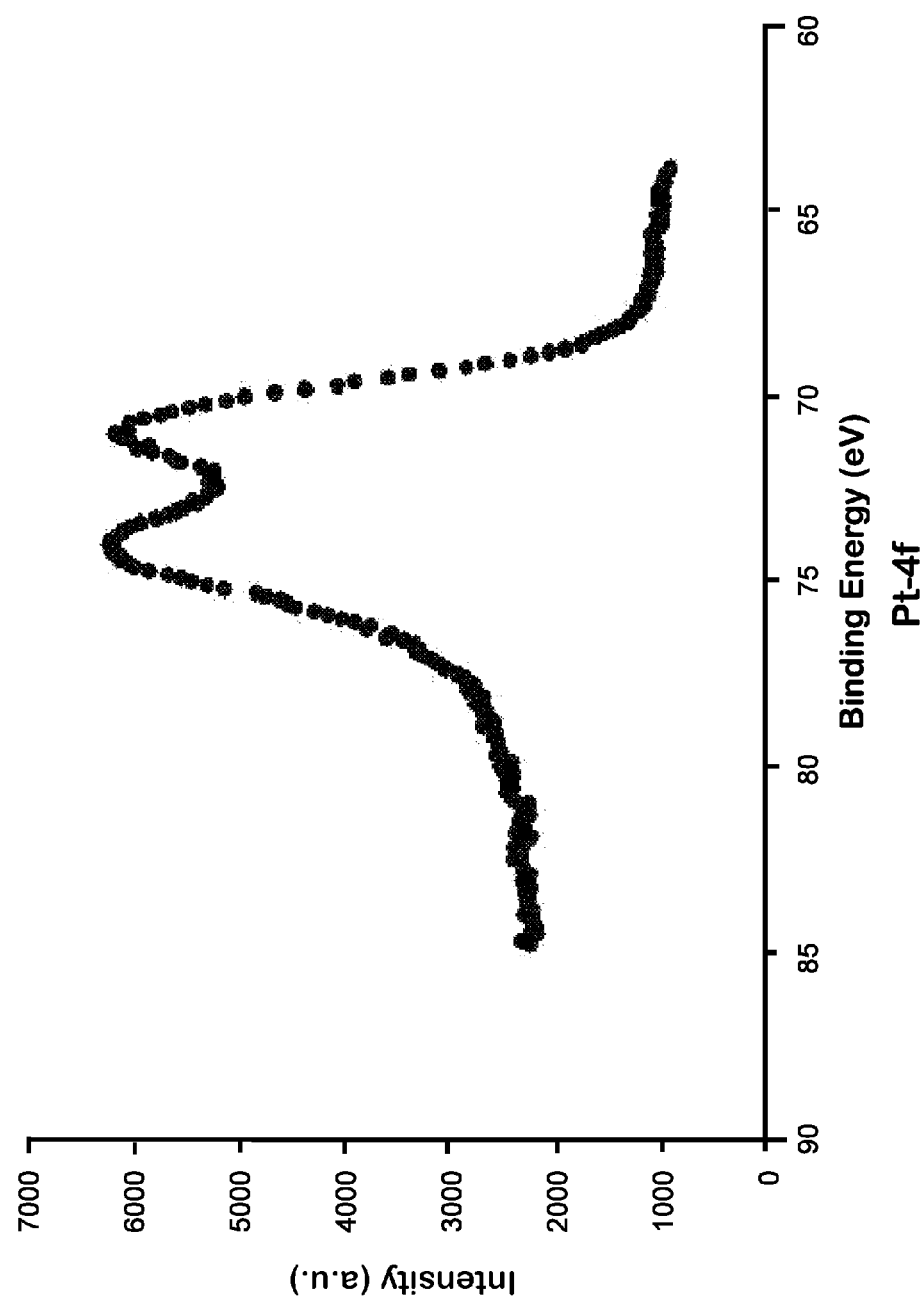
FIG. 2 depicts an XPS spectrum for Pt on stainless steel.

Before heating, the surfaces of the stainless steel balls were analyzed with Electron Dispersive X-ray Spectroscopy (EDS). The resulting data showed that the Pt on the surface averaged approximately 6±2 wt %. X-ray Photoelectron Spectroscopy (XPS) was carried out using stainless steel foil as a substitute for the stainless steel balls. Binding energies were calibrated using the Fe2p peak (BE=70.9 eV) as a reference. FIG. 2 shows the XPS spectrum for Pt-4f.

The platinum nanoparticles on the surfaces of the stainless steel particles were imaged via Scanning Electron Microscopy (SEM) (data not shown). The images showed crystalline and spherical nanoparticle formation, along with aggregation. The surfaces of the stainless steel balls with Pt were analyzed again after heating. We observed that nanoparticles had melted at the higher heating levels.

Example 3. Systems for Induction Pyrolysis

One embodiment of the present invention employed the catalyst in an induction heating system (RDO-LF model no. 5-35/100-3). A range of temperatures from 400° C. to 800° C. was tested to determine the effect on liquid pyrolysis yield. The induction heater was a low frequency model (RDO Induction LLC, Washington, N.J.) operated in the range 35-100 kHz using a 5 kW power supply. The reaction tube was a 310-stainless steel tri-clamp tube, 419 mm length, 34.4 mm inner diameter, and 38.1 mm outer diameter. An outlet with a 16.5 mm inner diameter was located 29.4 mm from the end of the reaction tube connected to the inlet airflow. The system was purged of oxygen using a continuous flow of argon gas at 1 L/min.

Figure 3A:
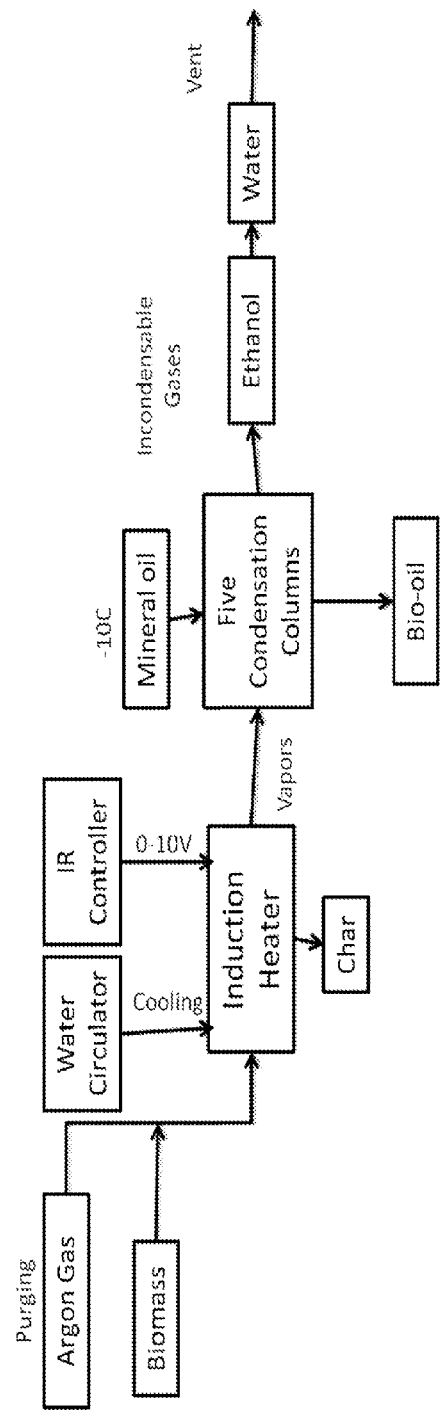
FIGS. 3A and 3B depict flowcharts for pyrolysis systems for bio-oil production.

FIG. 3a schematically depicts a prototype embodiment of the pyrolysis setup. The induction coil was a ten-loop, rubber-coated copper coil with an overall length of 285 mm and an inner diameter of 59 mm. The reaction tube temperature was monitored by an Omega iR2C series infrared laser controller (Omega, Stamford, Conn.). The controller adjusted the power of the RDO induction heater using a 0-10 V signal. The collection system comprised five condensation columns, through which mineral oil circulated at a temperature of −5° C. The columns were fitted to flasks to collect the condensed liquids. Uncondensed gasses were passed through ethanol and liquid filters before venting.

Figure 3B:
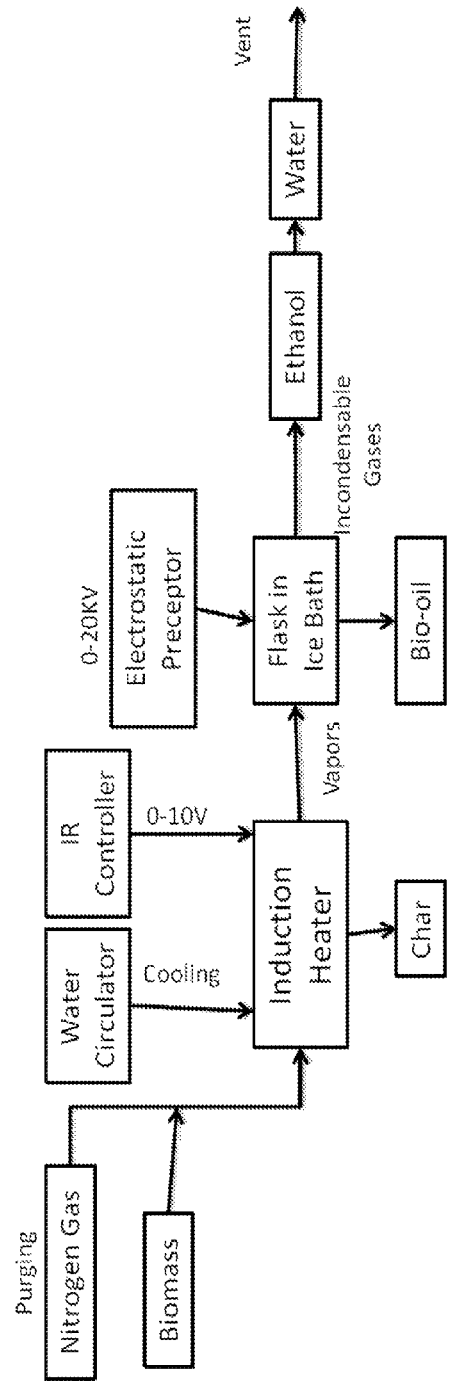

A second embodiment of the system improved the linearity of the process, reduced cost, and improved collection of the liquid bio-oil product. An outlet on the side of the tube was removed, and the reaction products flowed directly into the condensation flasks. This configuration addressed the problem of char residue buildup within the outlet joint, which would otherwise require more frequent cleaning. Argon gas was replaced with nitrogen gas. No significant difference in performance is expected between argon and nitrogen. Both are inert gases as used in this process, and nitrogen is generally less expensive. Modifications were also made to the condensation and collection components. The condensation columns were removed since they were difficult to clean, which also made it difficult to quantify any remaining oil left on their surfaces. The condensation columns were replaced by one individual collection flask submerged in an ice bath. To compensate for the lower surface area, an electrostatic precipitator was designed using a custom-made glass cylinder that tapered into a 34/40 ground glass fitting. A steel cylinder was inserted into a glass tube and attached to a ground wire through the rubber cap, and a steel rod was inserted through the cap and attached to the power supply. The power supply could operate between 0 and 20 kV, and was typically run at 120 V. These modifications both improved liquid yields and improved ease of use. FIG. 3b depicts a flowchart of the modified pyrolysis system used in the experiments of Example 6.

Example 4. Generalized System for Biomass Pyrolysis

Figure 4:
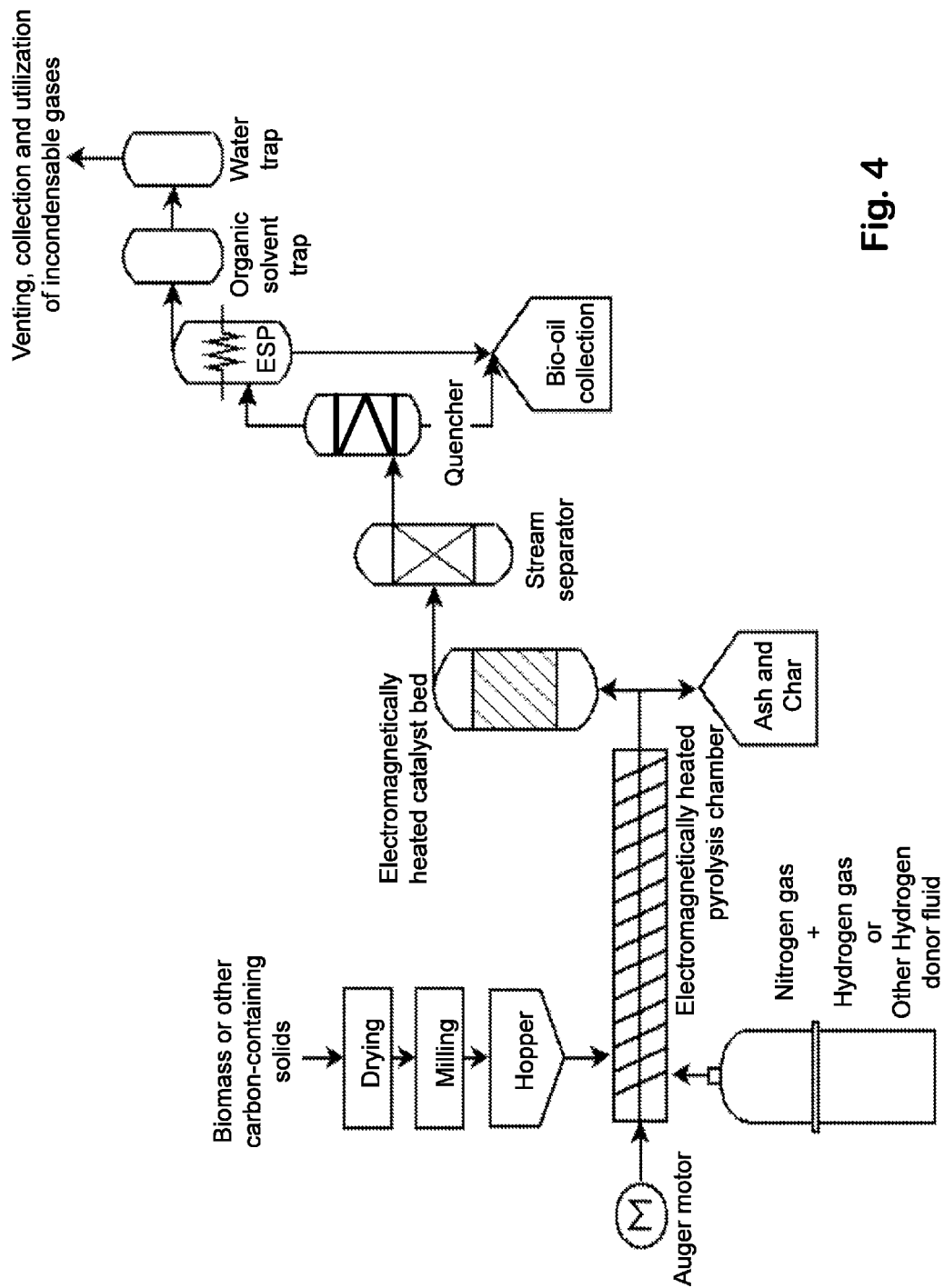
FIG. 4 depicts a generalized system for biomass pyrolysis.

FIG. 4 depicts a third embodiment, a generalized system for biomass pyrolysis. Biomass (or other carbon-containing solid feedstock, e.g., coal) is fed from the hopper into the pyrolysis chamber using an auger/motor system. Depending on the moisture content and particle size of the feedstock, drying and milling of the feedstock before pyrolysis is optional.

The electromagnetically heated pyrolysis chamber (i.e., the reactor) is flashed (or purged) with nitrogen gas to remove oxygen.

Hydrogen gas or other hydrogen donor fluid (gas or liquid) can be added to the reactor to improve bio-oil quality. It is desirable to make the bio-oil product as close as possible to a petroleum-equivalent or to a finished product (e.g., gasoline, diesel, etc.)

The biomass (or other carbon-containing solids) are heated inside the pyrolysis chamber. In the absence of oxygen, the material does not burn. Instead it is volatilized and pyrolyzed from larger molecules, especially long-chain polymers such as cellulose or lignocellulose, to produce smaller molecules. Three types of products are produced: (1) volatile compounds ("volatile," that is, at the pyrolysis temperature) which can subsequently be condensed into a liquid at room temperature; (2) non-condensable gases (e.g. $CH_4$, $CO$, $CO_2$, and $H_2$)—gases can optionally be used as a heat source in a heat exchanger or as a secondary feedstock in a burner to generate heat and electricity; and (3) char—on, high molecular weight compounds that are not volatilized, ash, and other residual solids.

In the electromagnetically heated catalyst bed, the volatile liquid and gas compounds are further processed in the presence of the catalyst to alter their composition, and particularly to remove oxygen. Were coal (or another low-oxygen source material) used instead of biomass, then water or steam could be added to the reaction mixture as a low-cost hydrogen source. Depending on the selected catalyst and the specific processing conditions in the catalyst bed, different products can be obtained, including gasoline, diesel, and other valuable compounds. The undergo subsequent purification in a stream separator. (The separator may be a separator such as is otherwise known in the art.)

A quencher and electrostatic precipitator (ESP) are used to condense gases into liquid. Compounds that are not condensed can be dissolved in solvent traps. For example, in one embodiment there are two solvent traps—uses water or other polar solvent, and the other uses a non-polar solvent. Dissolved compounds can later be separated from the solvents. Any non-condensable, insoluble gases that pass through the traps (e.g., $CH_4$, CO, $CO_2$, $H_2$, etc.) can be used to generate heat and electricity.

In most if not all previous methods of producing bio-oil, the catalyst bed has been heated externally, which tends to lead to clogging when gases repolymerize on the catalyst surface or on reactor walls. By contrast, in preferred embodiments of the present invention, the catalyst bed is hotter than the gas stream, which causes gases to tend to move away from the catalyst surface and walls, thus reducing clogging and catalyst poisoning.

Example 5. Methods for Induction Pyrolysis

Two sets of experiments were run using induction heating (FIG. 3a). Experiment 1 was a time-versus-temperature experiment used to determine the time needed to essentially complete the conversion of biomass at various temperatures. Experiment 2 was the pyrolysis of pine sawdust (PSW) at different operating temperatures to quantify and analyze the chemical composition of the bio-oil fraction.

The procedures for these experiments were as follows. First, 30 grams of PSW feedstock were weighed and packed in the center of the reaction tube. The tube was then placed in the induction coil, supported by wooden blocks. One end of the tube was attached to the inlet argon gas flow, and the other to the gas outlet, which connected to the condensing system. The flow rate of argon was 1 L/min$^{-1}$. The system was purged with argon for 20 min to lower oxygen levels below ~1%. The operating temperature was set on an infrared PID controller, and the system was operated for 10-minute increments. After 10 minutes, the system was cooled and the char remaining in the reaction tube was weighed. The char was then reinserted into the reaction tube, and the process was repeated until no further significant change was recorded in the char mass. The temperatures tested to determine complete reaction times were 400° C., 500° C., 600° C., 700° C., and 800° C. A type-K thermocouple was placed in the outlet port to determine whether the internal temperature differed from the temperature observed by the infrared controller on the reaction chamber surface (no notable differences were observed).

For the second experiment, the reaction time was set at 60 min for 400° C., 40 min for 500° C., 30 min for 600° C., and 20 min for both 700° C. and 800° C. Gas samples were collected for analysis once the system reached the respective operating temperature. The condensed liquids were collected from the flasks, weighed, and analyzed. The yields of liquid and char were calculated from the measured weights of the collected materials, divided by the initial biomass weight; the difference represented the presumptive gas yield.

Before analysis the bio-oil samples were mixed well. A 1 mL sample was removed and added to 2 mL of 99% pure hexane (Sigma Aldrich). The sample and solvent were mixed thoroughly to maximize the extraction of soluble compounds. The samples were allowed to separate for 15 minutes, and the hexane fraction was decanted for further analysis. The hexane-soluble fraction was analyzed by gas chromatography/mass spectroscopy (GC-MS). 1-μL samples were manually injected into the GC with a syringe.

The gas samples were analyzed to determine the content of combustible and incombustible gasses (CO, $CO_2$, and $CH_4$), using a SRI 8610C Gas Chromatograph equipped with a FID, ECD, and TCD. A Varian Saturn 2200 Ion Trap MS had a 3800 GC attached. The system used a DB5 column. The water content of the liquid fraction was determined using a Karl-Fischer moisture titrator (Metrohm Model 831 KF Coulometer), with triplicate measurements to ensure accurate readings.

Example 6. Comparison of Materials in Induction Pyrolysis

A third experiment compared several biomass feedstock materials under the same operating conditions as the first two experiments, to determine the effects of the type of biomass on the resulting products.

This experiment used the system depicted in FIG. 3b, with an electrostatic precipitator and a linear reaction tube. Pine sawdust (PSW), cellulose (CEL), and Chinese tallow tree wood (CTT) were tested at temperatures ranging from 500° C. to 700° C. at 50° C. increments. The yields of char and bio-oil were determined by weight, and the difference was presumed to represent the gas fraction.

GC-MS was performed using a Shimadzu GC 2010 with dichloromethane as the solvent. The ratio of solvent to bio-oil was 5:1. Samples were compared to a reference standard containing 100 ppm BTEX (benzene, toluene, ethyl benzene, and xylene). Separately, the liquid and char samples were analyzed with an elemental analyzer (Perkin Elmer 2400 Series 2 CHNS/O) to determine carbon, hydrogen, and nitrogen (CHN) content of the samples. Samples of either char or liquid were weighed and sealed in small tin containers. These containers were placed in the elemental analyzer, and the contents were combusted under oxygen gas flow.

The pyrolysis and upgrading experiments were conducted in two separate induction heating machines. Three samples of biomass (PSW, lignin, and CEL) were studied, both during and after pyrolysis. The biomass samples were heated in an RDO induction heater, low frequency model (RDO Induction LLC, Washington, N.J.), operated in the range 35-100 kHz, using a 5 kW power supply. The reaction tube was a 310-stainless steel tri-clamp tube, 419 mm long, 34.4 mm inner diameter, and 38.1 mm outer diameter. An outlet with a 16.5 mm inner diameter was located 29.4 mm from the end of the reaction tube attached to the inlet airflow. The system was purged of oxygen using a continuous flow of nitrogen gas at 1 L/min for 20 min.

The induction coil was a ten-loop, rubber-coated copper coil with an overall length of 285 mm and an inner diameter of 59 mm. The reaction tube temperature was controlled with an Omega iR2C series infrared controller (Omega, Stamford, Conn.). An infrared laser monitored the temperature, and the power of the RDO induction heater was modified based on the temperature data feedback. The reaction temperature for PSW and lignin was 550° C., while that for CEL was 500° C. These temperatures were chosen based on preliminary experiments.

The vapors from reactor 1 were passed over an HZSM-5 catalyst inside a 2.54 cm ID stainless tube. This tube was heated with a second induction heater. Three biomass-to-catalyst (B/C) ratios (1:1, 1:1.5, and 1:2) were studied; three temperatures (290° C., 330° C., and 370° C.) were studied at each B/C ratio. The catalyst was used twice for each combination of ratio and temperature, to measure the extent of catalyst deactivation. The resulting vapors were condensed in a round bottom flask in an ice bath. The remaining vapors were passed through an electrostatic precipitator to collect remaining condensable gases. The bio-oil was collected and refrigerated at −20° C. to inhibit polymerization reactions. Gas samples were also collected for analysis.

Liquid, gas, and char yields were quantified. Oil and char samples were analyzed for C, H, N, and O content using a Perkin-Elmer 2400 elemental analyzer. Gas samples were analyzed for $C_1$-$C_5$ hydrocarbon, $CO_2$, and CO composition. Water content in the liquid samples was measured by Karl-Fisher titration. BTEX composition analysis used a GC-FID by Shimadzu with a BTEX standard. GC-MS used a Varian 1200 series for product identification. The catalyst was studied using X-ray Diffraction (XRD) and XPS, both before and after reaction. SEM images of catalysts and biomass were taken both before and after the reaction. The catalyst surface area was measured with the surface analyzer.

Preferred methods for catalytic upgrading include hydrodeoxygenation, and zeolite cracking followed by dehydration. Hydrodeoxygenation may be carried out, for example, with commercial Ni catalysts, AlMCM, or amberlyst. HZSM-5 is a preferred zeolite catalyst. HZSM-5 is dielectric, which means that is readily heated by microwave irradiation. Commercial Ni catalysts showed good activity in processing biomass-derived liquids, and they were readily regenerated. Metal/metal oxide catalysts can be used to convert smaller, oxygenated molecules into larger molecules containing less oxygen. Metal/metal oxide catalysts can also be used to deoxygenate phenols. Solid base catalysts tended to reduce acidity of bio-oils. Overall, HZSM-5 gave the highest aromatic hydrocarbon yields of any catalyst we have tested to date.

Results

Example 7. Results from Induction Pyrolysis without Upgrading

Figure 5:
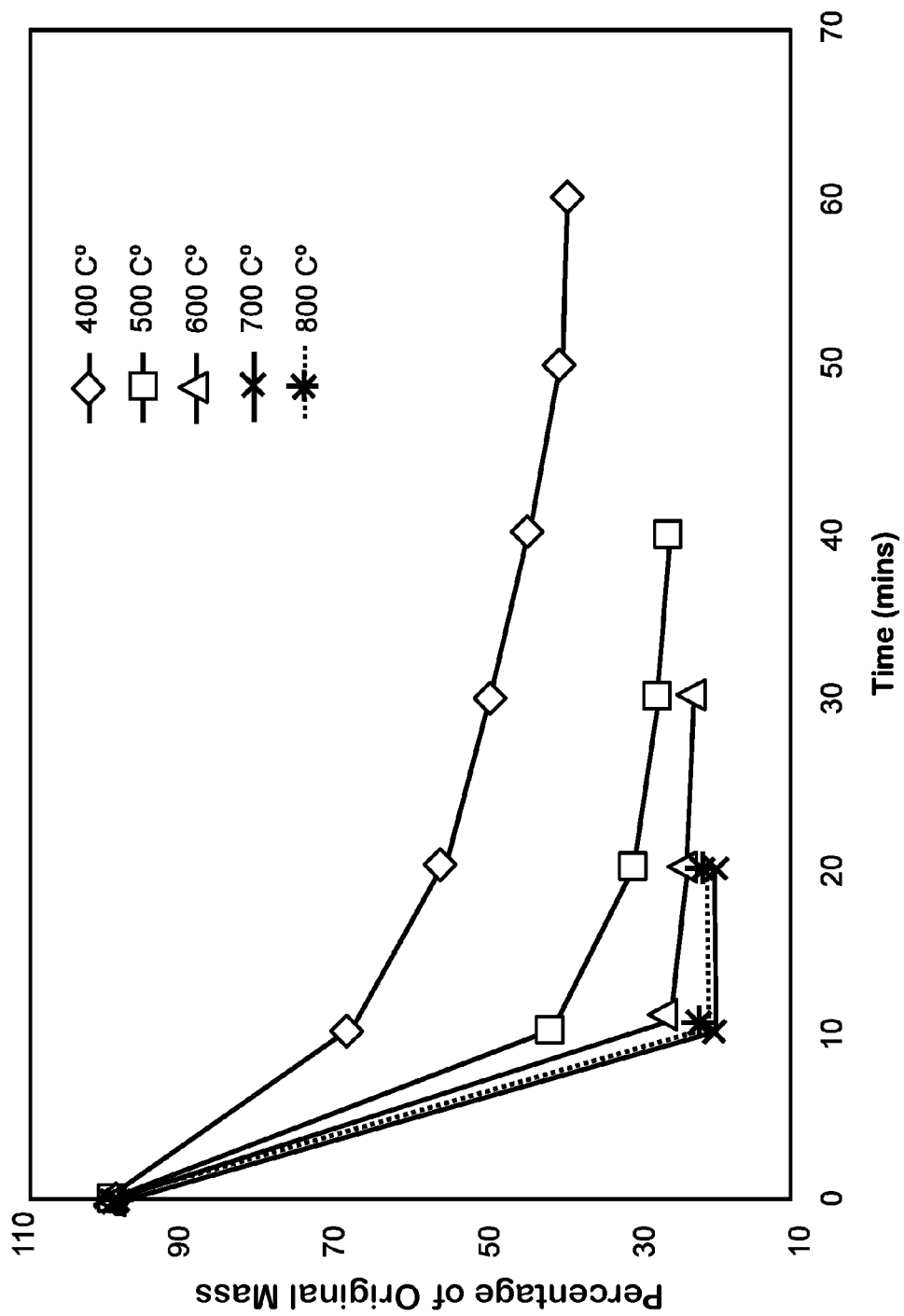
FIG. 5 depicts the reduction in biomass weight as a function of time at different pyrolysis reaction temperatures.

Char weights from incrementally timed reactions were examined to determine both the biomass conversion rate and the total time required to completely convert the biomass. Results showed a markedly shorter time for complete conversion of the biomass as the reaction temperature increased. The final char mass declined as temperature increased from 400° C. to 800° C. FIG. 5 shows the reduction of biomass weight as a function of time for different reaction temperatures.

Example 8. Characterization of the Liquid Fraction from Example 5

Figure 6:
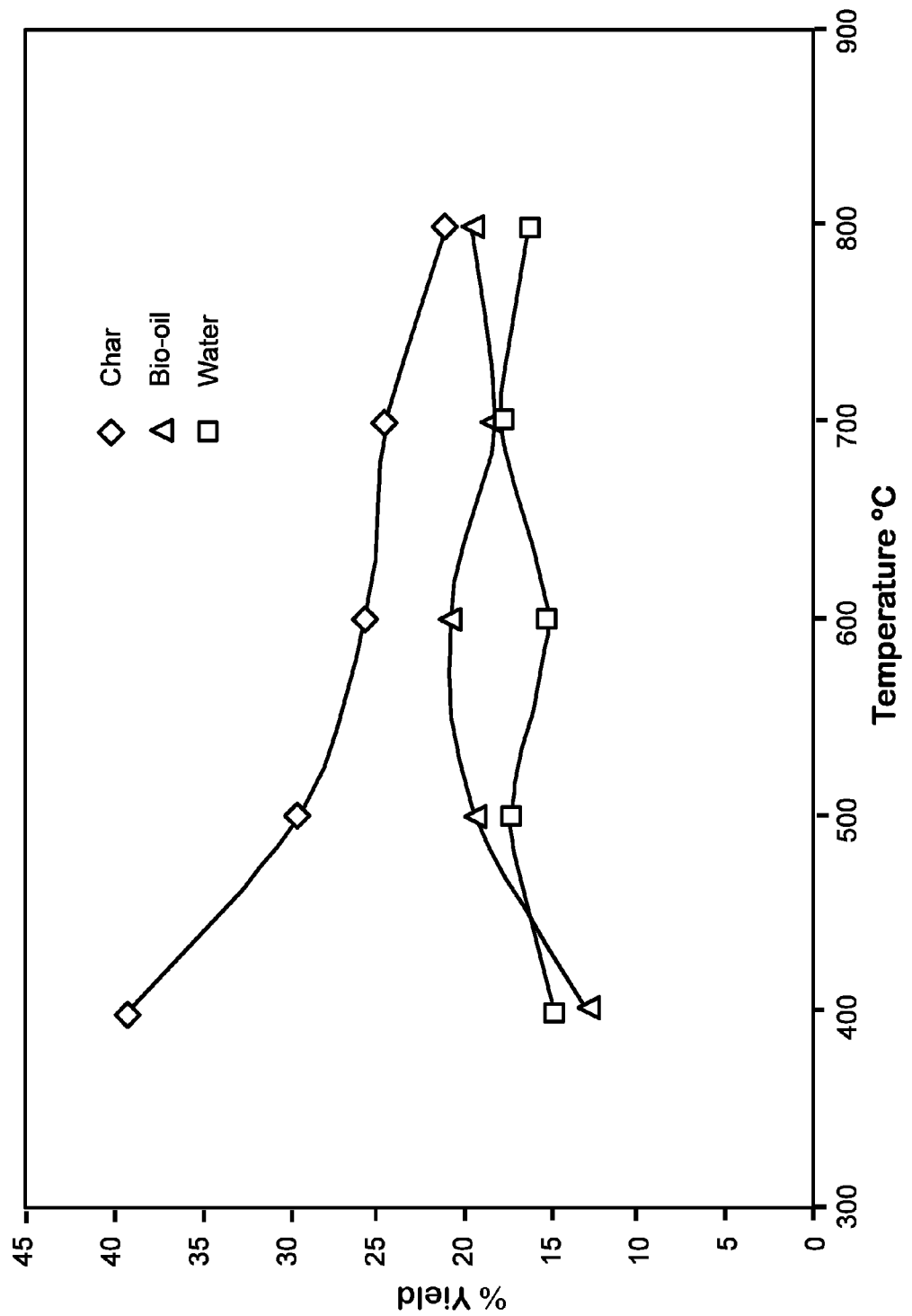
FIG. 6 depicts the dependence of char, water, and bio-oil yields on pyrolysis temperature.
Figure 7A:
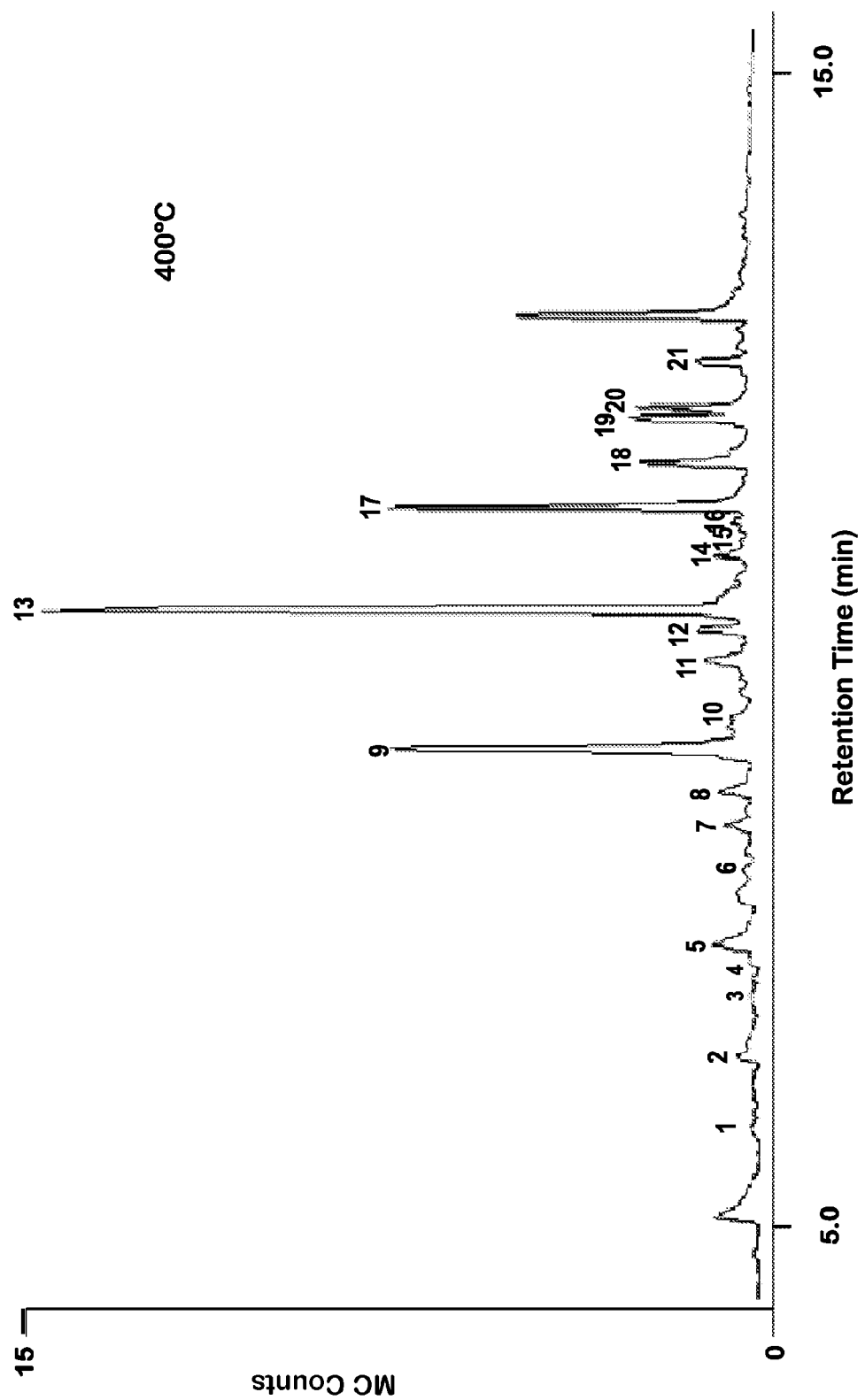
FIGS. 7A-7E depict gas chromatographs for bio-oil produced at different pyrolysis temperatures.
Figure 7B:
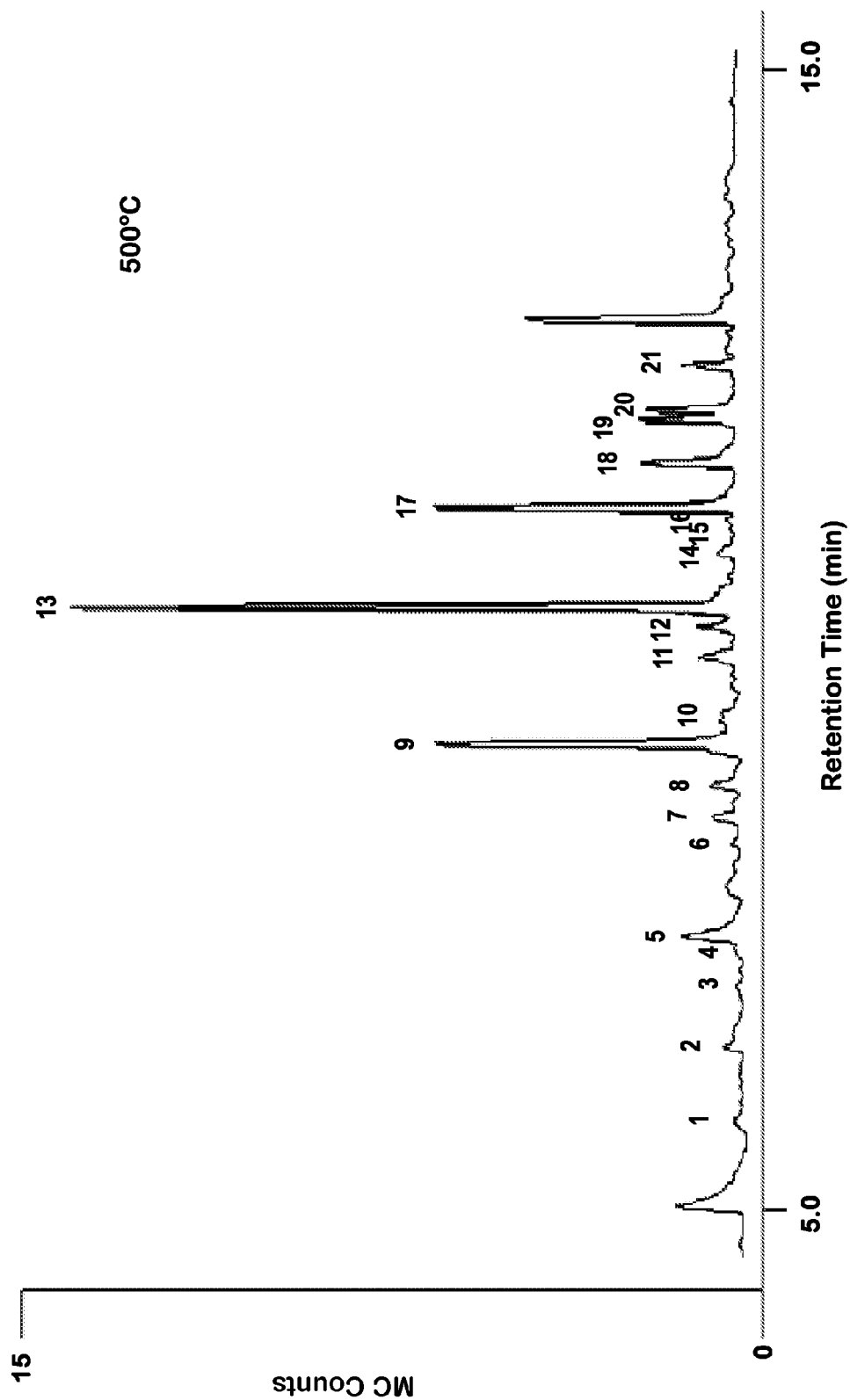
Figure 7C:
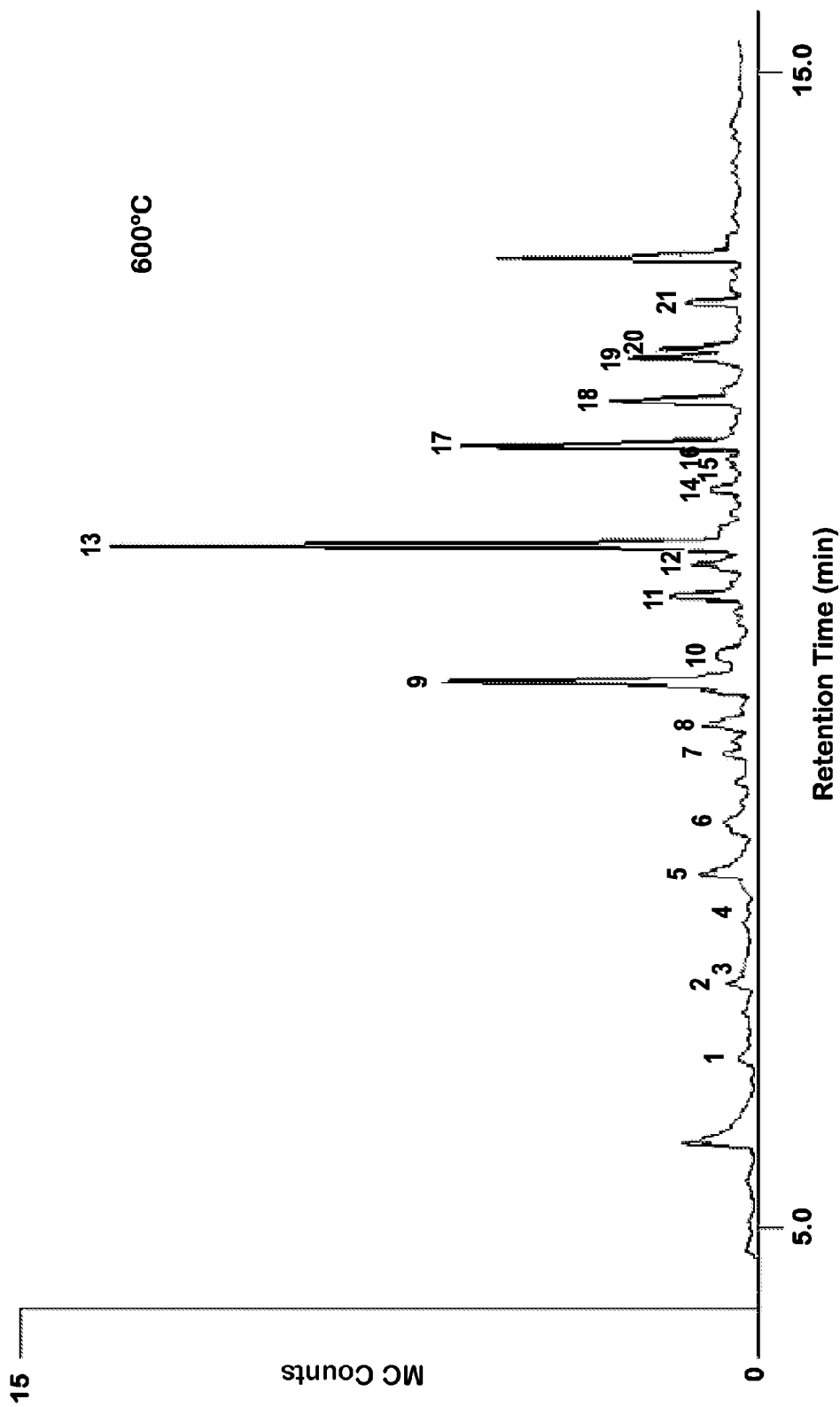
Figure 7D:
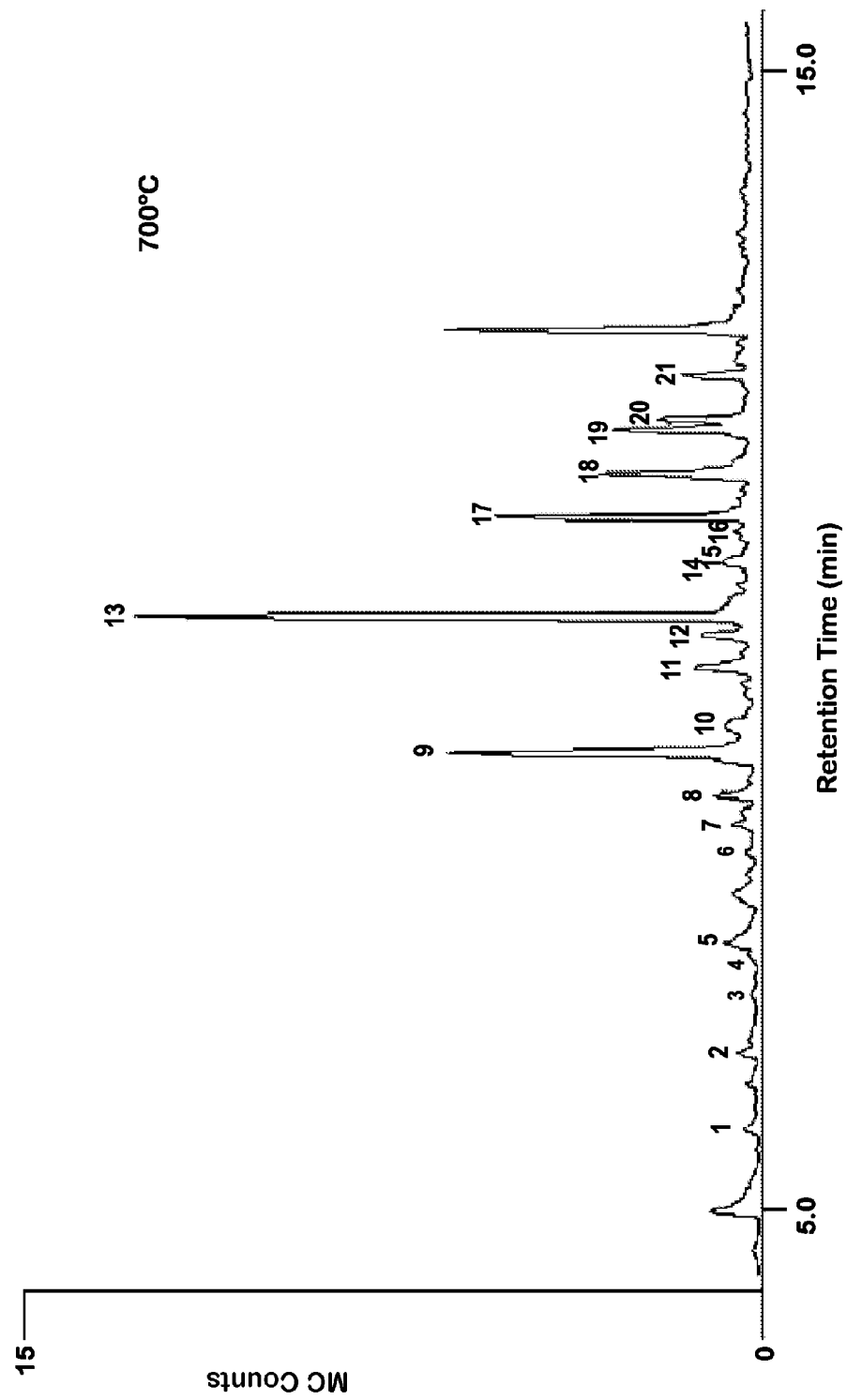
Figure 7E:
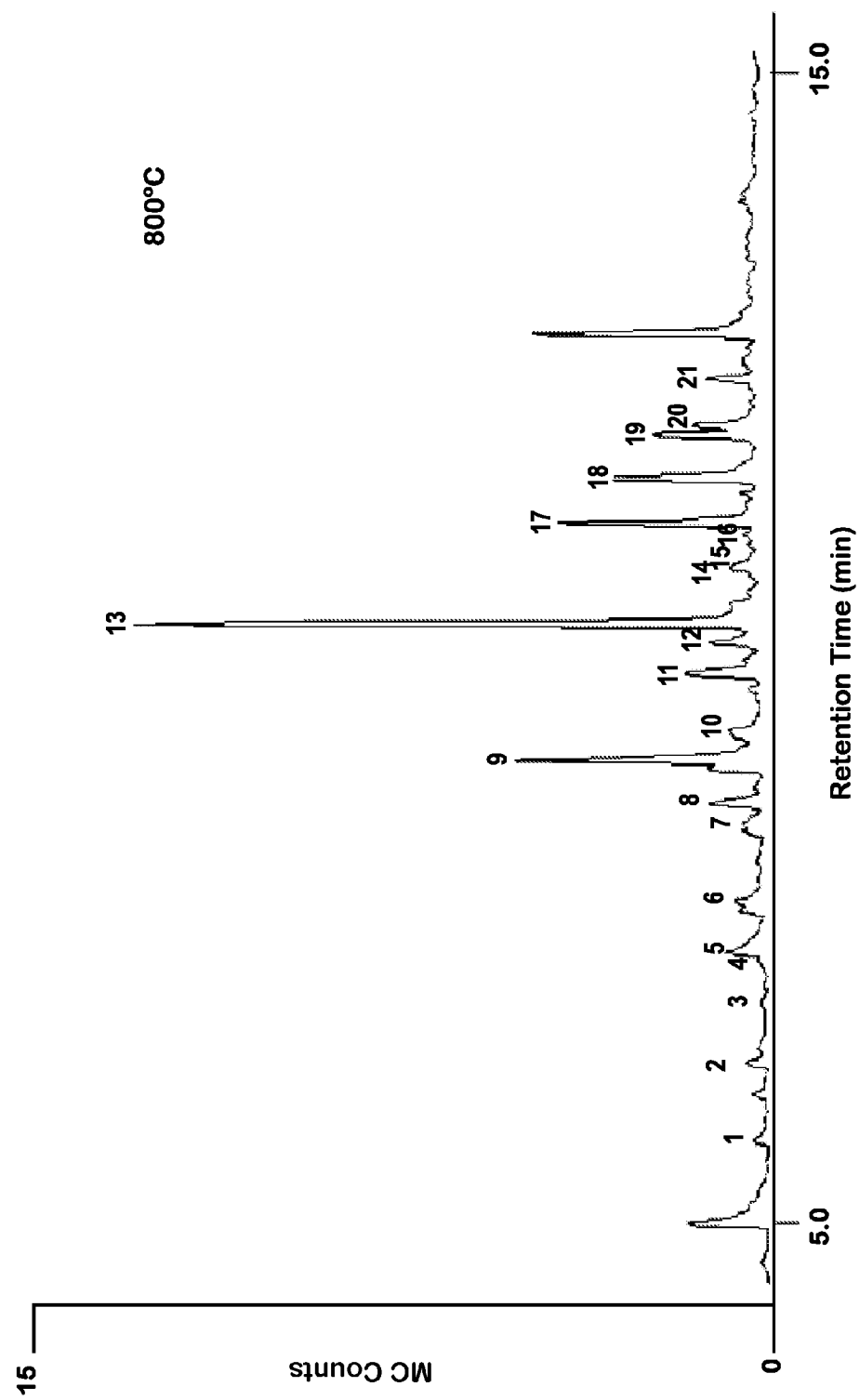

The products of the PSW pyrolysis of Example 5 were examined to determine the effects of temperature on the yield of the fractions produced, and the changes in composition of the fractions. Char yield declined as temperature increased from 400° C. to 800° C., with increasing conversion of biomass at higher temperatures. The incremental decline in char mass was less pronounced at 600-800° C. (25.6-21.0%) than at 400-500° C. (39.1-29.4%). Total liquid yield (bio-oil and water) increased at 400-500° C. (27.6-36.5%), but then remained stable from 500-800° C. (insignificant changes, with less than 1% variation.) This leveling off could be the result of the loss of uncondensed molecules with smaller molecular weights that would be expected at higher temperatures. FIG. 6 shows the dependence of char, water, and bio-oil yields on the pyrolysis temperature at a temperature-dependent holding time, an argon flow rate of 1 L/min, and a condensation temperature of −5° C.

The hexane-extracted fraction of the bio-oil was analyzed by GC-MS to identify the organic compounds generated by pyrolysis. FIGS. 7A-7E show the chromatographs from different pyrolysis temperatures, showing the presence of numerous compounds in varying concentrations. There was little variation in the peak patterns, suggesting that the temperature has less effect on the quality of the oil than it does on the quantity. Pyrolysis products from PSW were a complex mixture of organic compounds that made identification and quantification of specific organic molecules quite challenging. Using computerized search capabilities, probable compounds in the bio-oil sample were tentatively identified. Individual peaks in FIGS. 7A-7E are labeled to correspond to the rows having the same numbers in Table 2. The compounds identified in the sample were consistent with what would be expected for a non-upgraded pyrolytic bio-oil. Many aromatic and oxygenated organic compounds were seen, including various ketones and phenols.

TABLE 2

GC-MS compounds identified in pine sawdust (PSW) pyrolysis samples at different temperatures. The numbering in the table corresponds to that in FIGS. 7A-7E.

| Peak no. | Time$^a$ min. | Compound | Chemical Composition |
|---|---|---|---|
| 1 | 5.55 | Ethylbenzene | $C_8H_{10}$ |
| 2 | 6.15 | Styrene | $C_8H_8$ |
| 3 | 6.55 | 1-(2-furanyl)ethanone | $C_6H_6O_2$ |
| 4 | 7.4 | 5-methyl-2-furancarboxaldehyde | $C_6H_6O_2$ |
| 5 | 7.7 | Phenol | $C_6H_6O$ |
| 6 | 8.5 | Indene | $C_9H_9$ |
| 7 | 8.65 | p-Cresol | $C_7H_8O$ |
| 8 | 8.95 | m-Cresol | $C_7H_8O$ |
| 9 | 9.1 | Guaiacol | $C_6H_6O_2$ |
| 10 | 9.33 | 2,4-dimethylphenol | $C_8H_{10}O$ |
| 11 | 9.65 | 2-ethylphenol | $C_8H_{10}O$ |
| 12 | 9.8 | 3,5-dimethylphenol | $C_8H_{10}O$ |
| 13 | 10 | 4-ethyl-phenol | $C_8H_{10}O$ |
| 14 | 10.7 | 4-ethyl-3-methyl phenol | $C_9H_{12}O$ |
| 15 | 10.75 | 3,4-dimethoxytoluene | $C_9H_{12}O_2$ |
| 16 | 10.8 | 1-ethyl-4-methoxybenzene | $C_9H_{12}O$ |
| 17 | 11.2 | 4-ethylguaiacol | $C_9H_{12}O_2$ |
| 18 | 11.55 | 2-methoxy-4-vinylphenol | $C_9H_{10}O_2$ |
| 19 | 11.85 | Eugenol | $C_{10}H_{12}O_2$ |
| 20 | 12 | 4-propylguaiacol | $C_{10}H_{14}O_2$ |
| 21 | 12.4 | Isoeugenol | $C_{10}H_{12}O_2$ |

Figure 8:
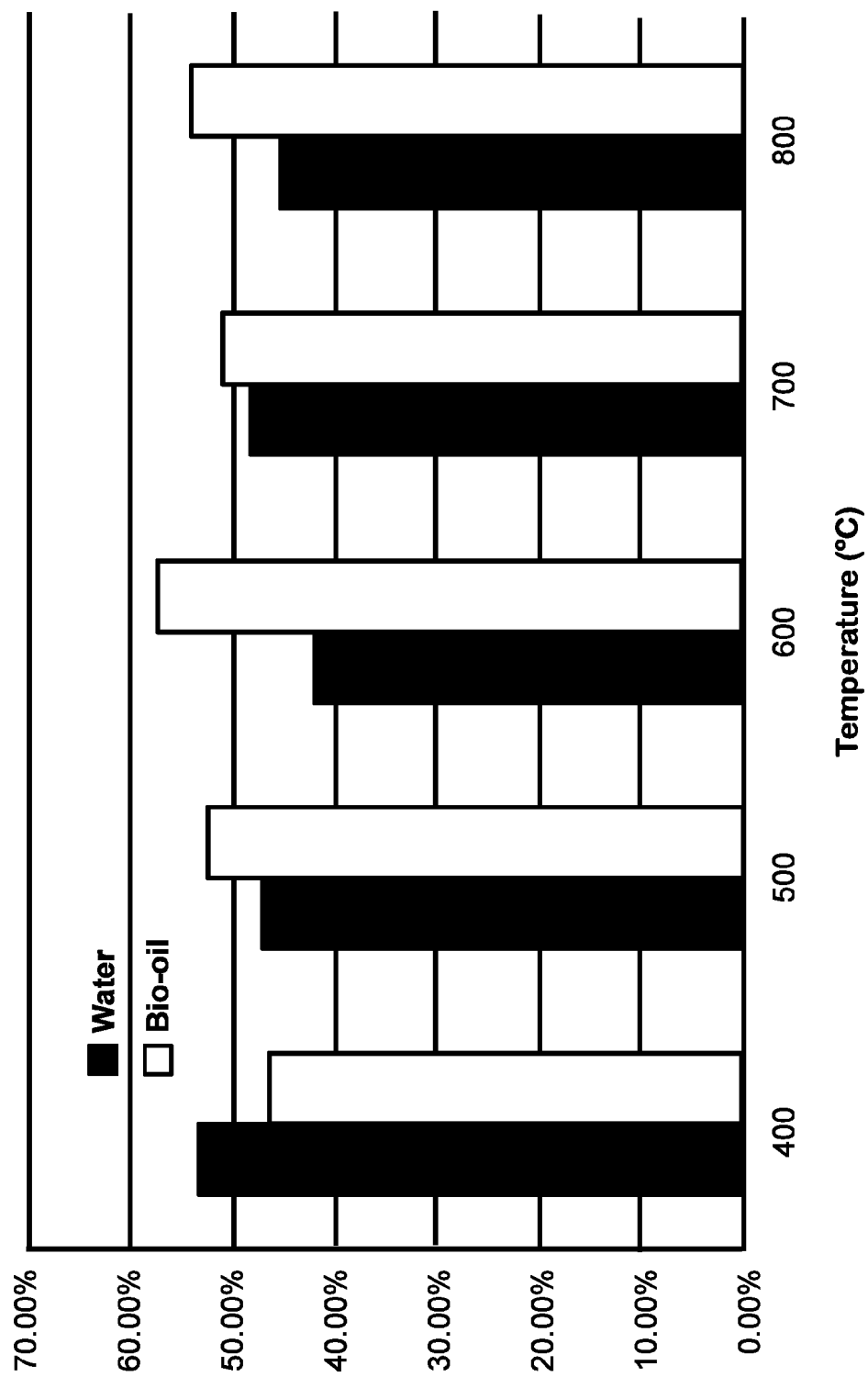
FIG. 8 depicts the water content of the liquid fraction of tested bio-oil samples.

Karl-Fischer titration was performed to determine the water content of the liquid fraction of the tested samples. As shown in FIG. 8, water content was highest at 400° C. and lowest at 600° C. There was a downward trend in water content from 400° C. to 600° C., followed by a slight upward trend from 600° C. to 800° C. However, the overall water content (43.3-53.5%) was fairly high in all cases. For most applications, water should be removed from the bio-oil product before it is used as a fuel.

Example 9. Characterization of the gas fraction from Example 5

Figure 9:
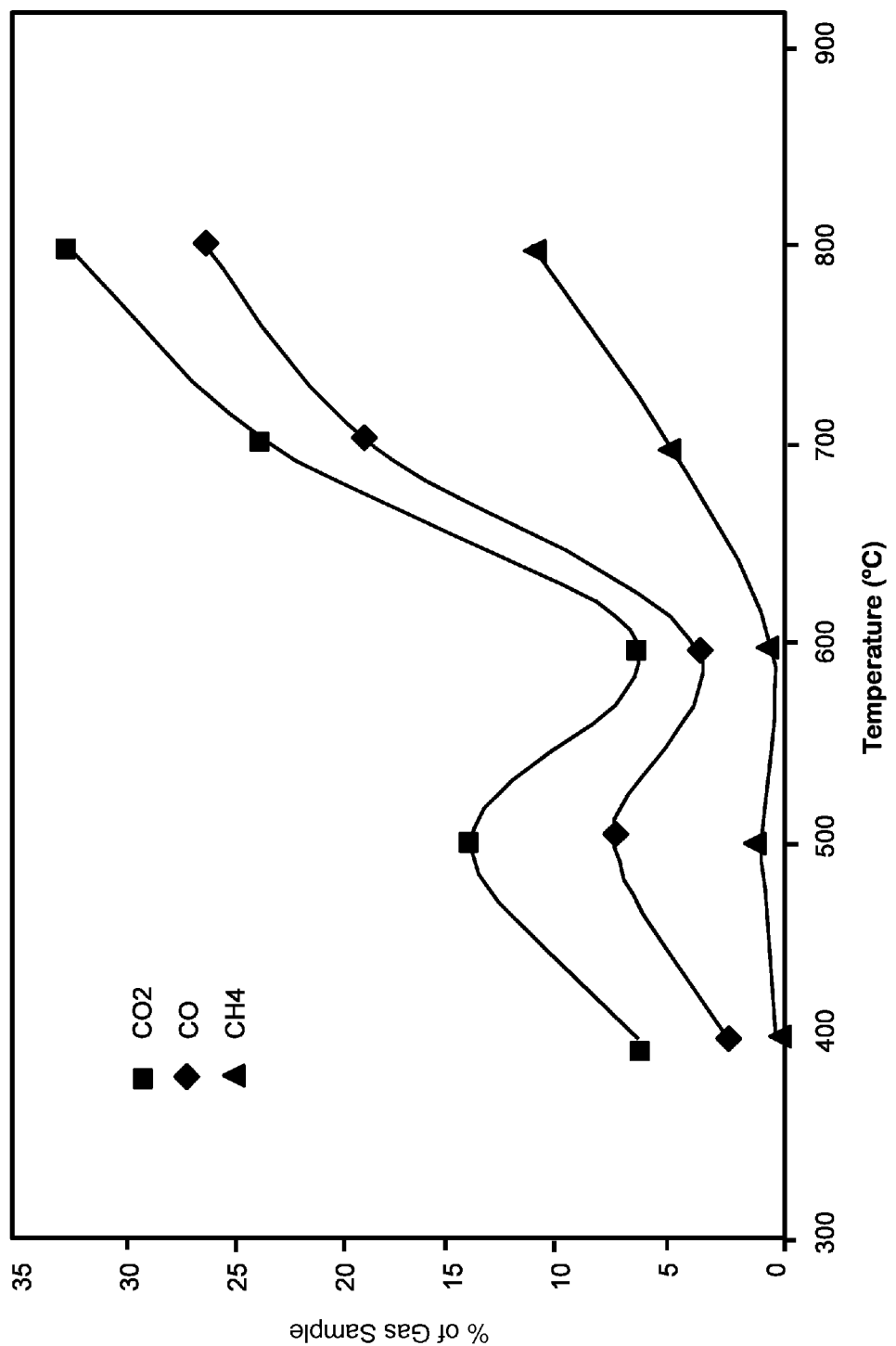
FIG. 9 depicts the dependence of the yield of three gases on pyrolysis temperature.

Gas samples were analyzed by GC to determine the presence of combustible and incombustible gases (CO, $CO_2$, and $CH_4$) that could have value as secondary products. Analyses showed that the concentration of combustible gasses increased as the pyrolysis temperature increased from 400° C. to 800° C. The combustible nature of these gases and their increasing concentration as the temperature increased suggested a more complete breakdown of biomass at higher temperatures. FIG. 9 shows gas concentrations (CO, $CO_2$, and $CH_4$) as a function of pyrolysis temperature.

Example 10. Yield Data from Example 6

Figure 10:
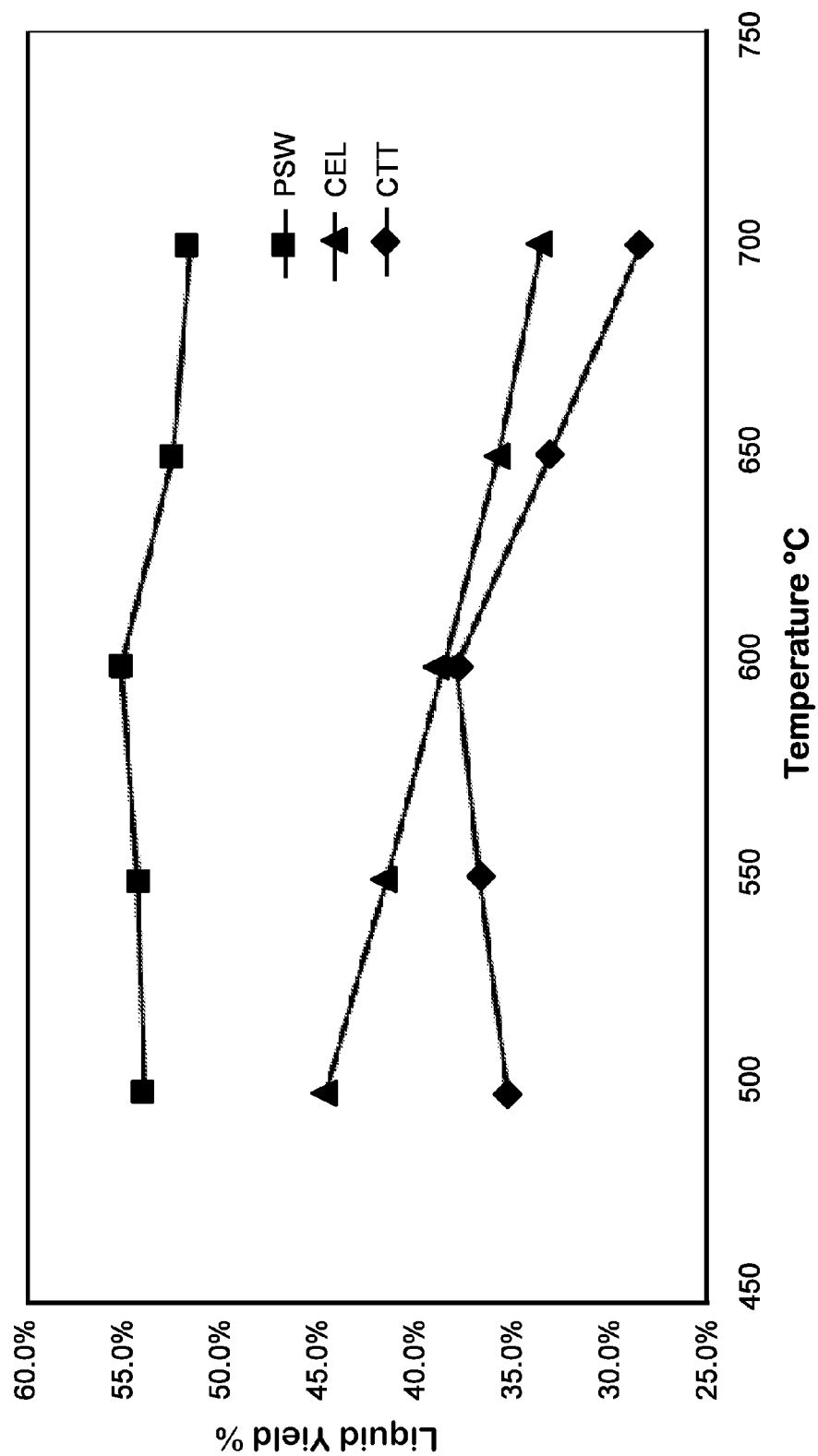
FIG. 10 depicts the liquid yield for different biomass sources at various pyrolysis temperatures.
Figure 11:
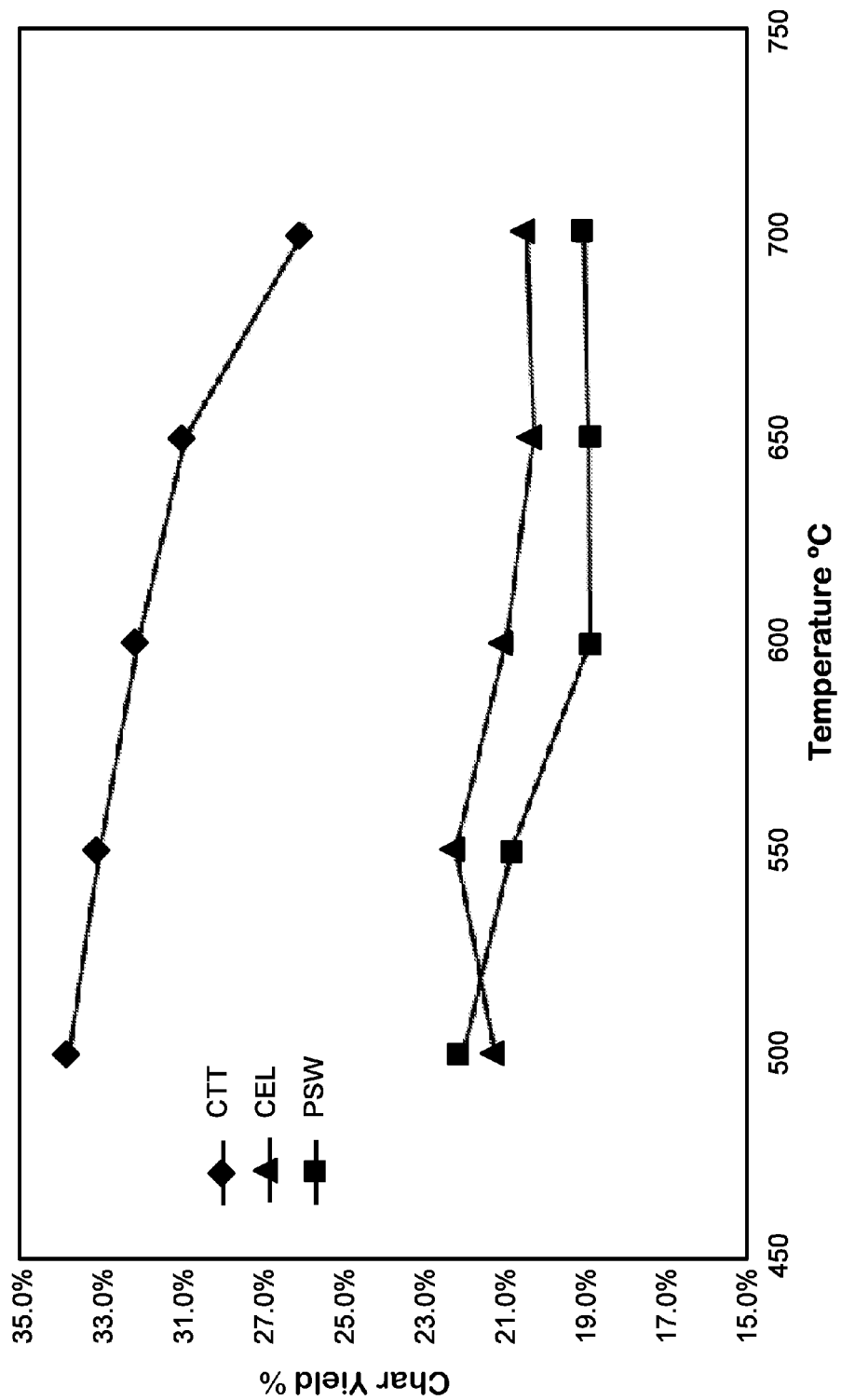
FIG. 11 depicts the solid (char) yield for different biomass sources at various pyrolysis temperatures.
Figure 12:
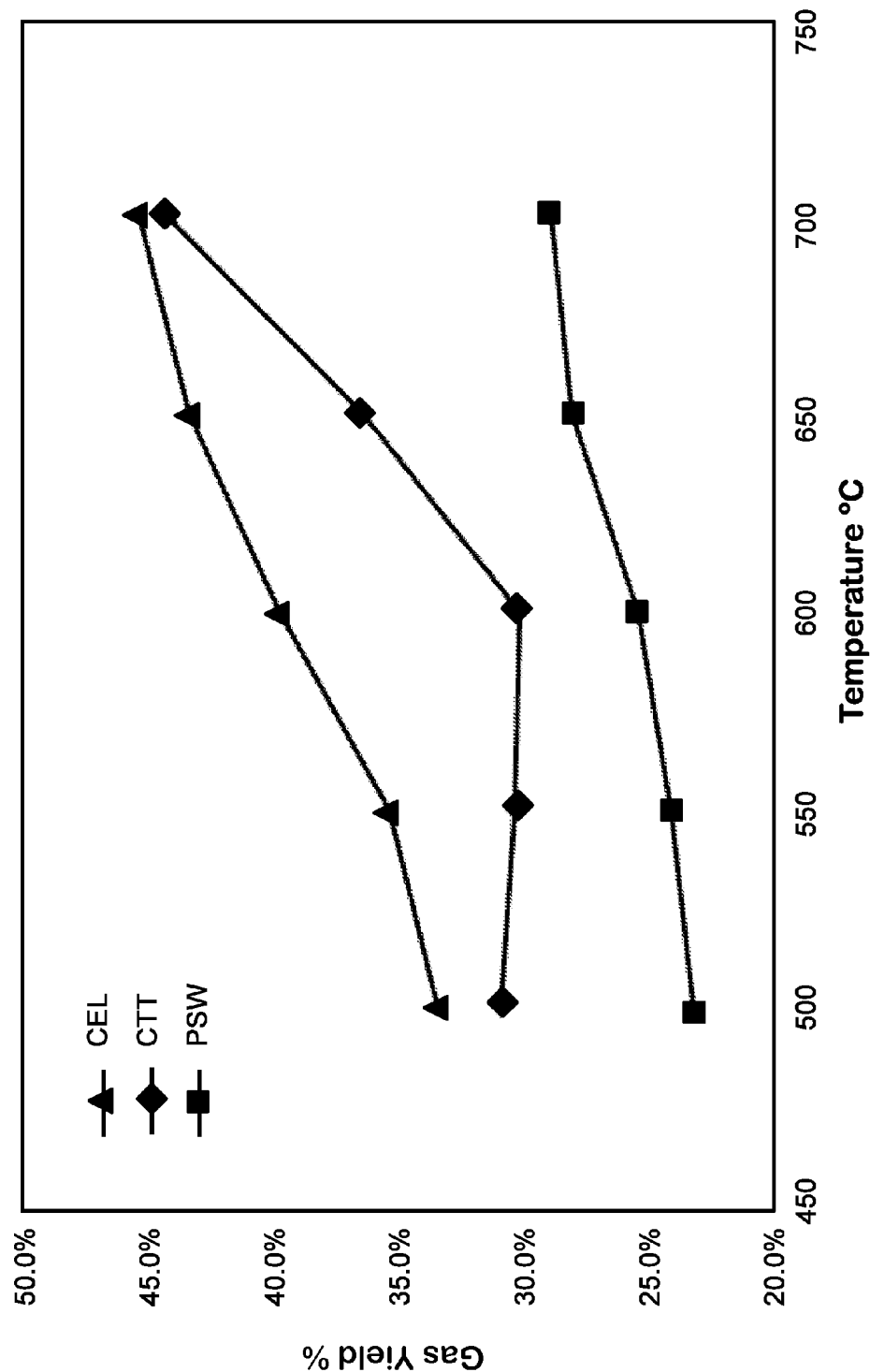
FIG. 12 depicts the gas yield for two biomass sources at various pyrolysis temperatures.

Liquid, char, and gas yields from three different biomass sources (PSW, CTT, and CEL) were compared at five different pyrolysis temperatures, ranging from 500° C. to 700° C. in 50° C. increments. FIG. 10 shows a slight upward then downward trend for the liquid yields from PSW and CTT as temperature increased, and a steady downward trend for the liquid yield from CEL. FIG. 11 shows a declining trend in char yield as the temperature increased from 500° C. to 700° C. FIG. 12 shows the yield of uncondensed gases. As the temperature increased, the gas yield increased.

Example 11. Characterization of the Solid Fraction from Example 6

Figure 13:
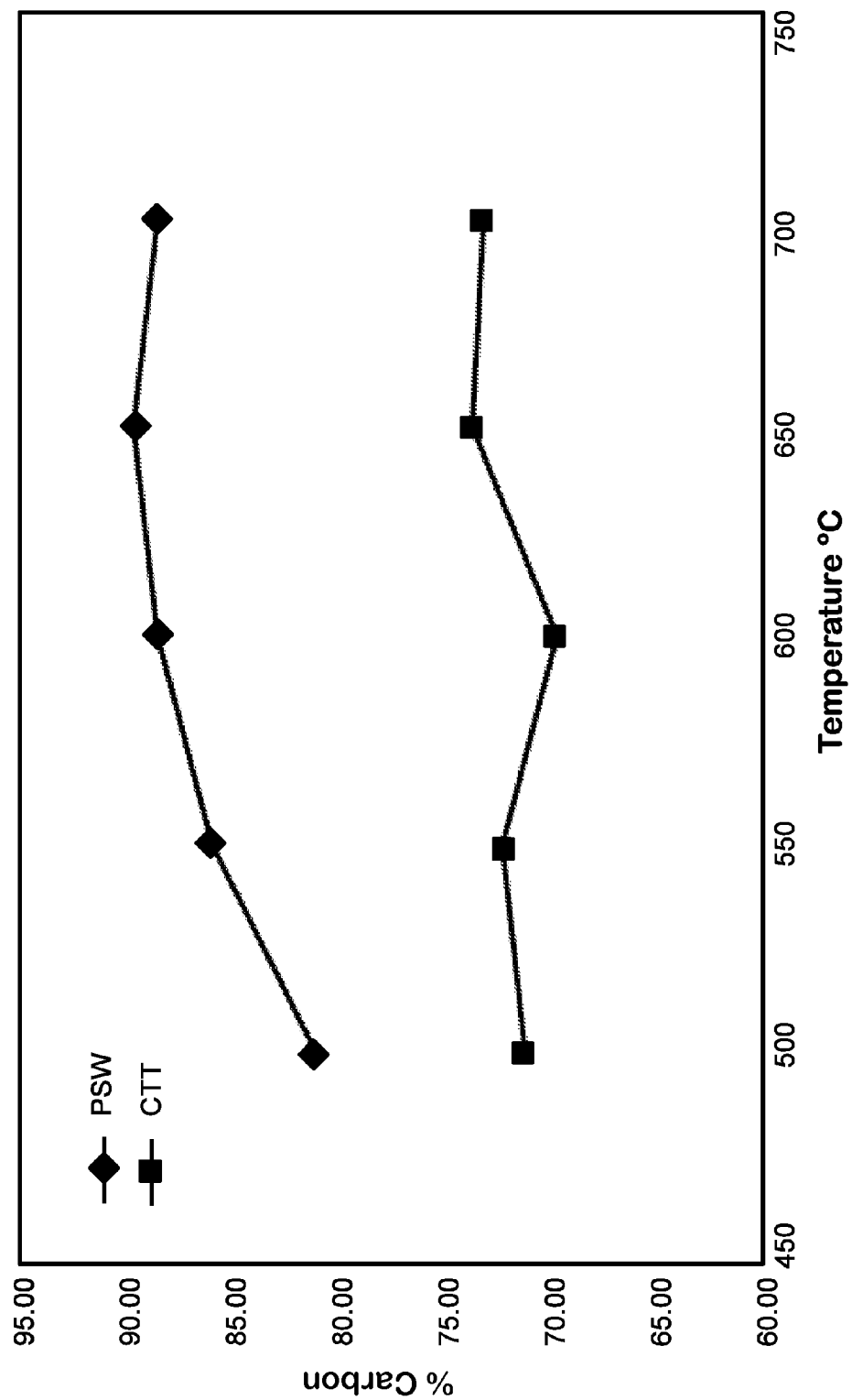
FIG. 13 depicts the carbon content of char after pyrolysis of two biomass sources at various temperatures.
Figure 14:
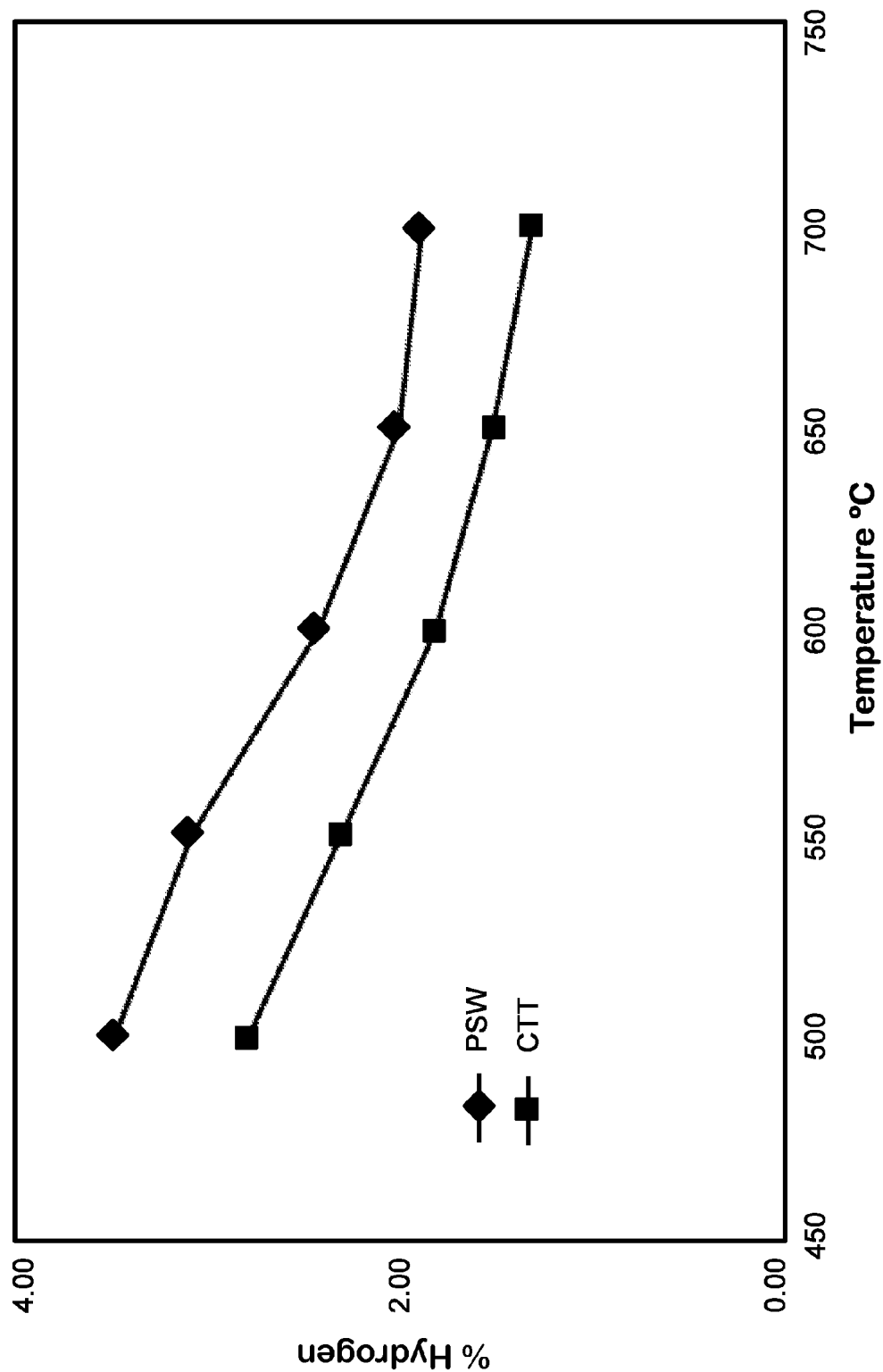
FIG. 14 depicts the hydrogen content of char after pyrolysis of two biomass sources at various temperatures.
Figure 15:
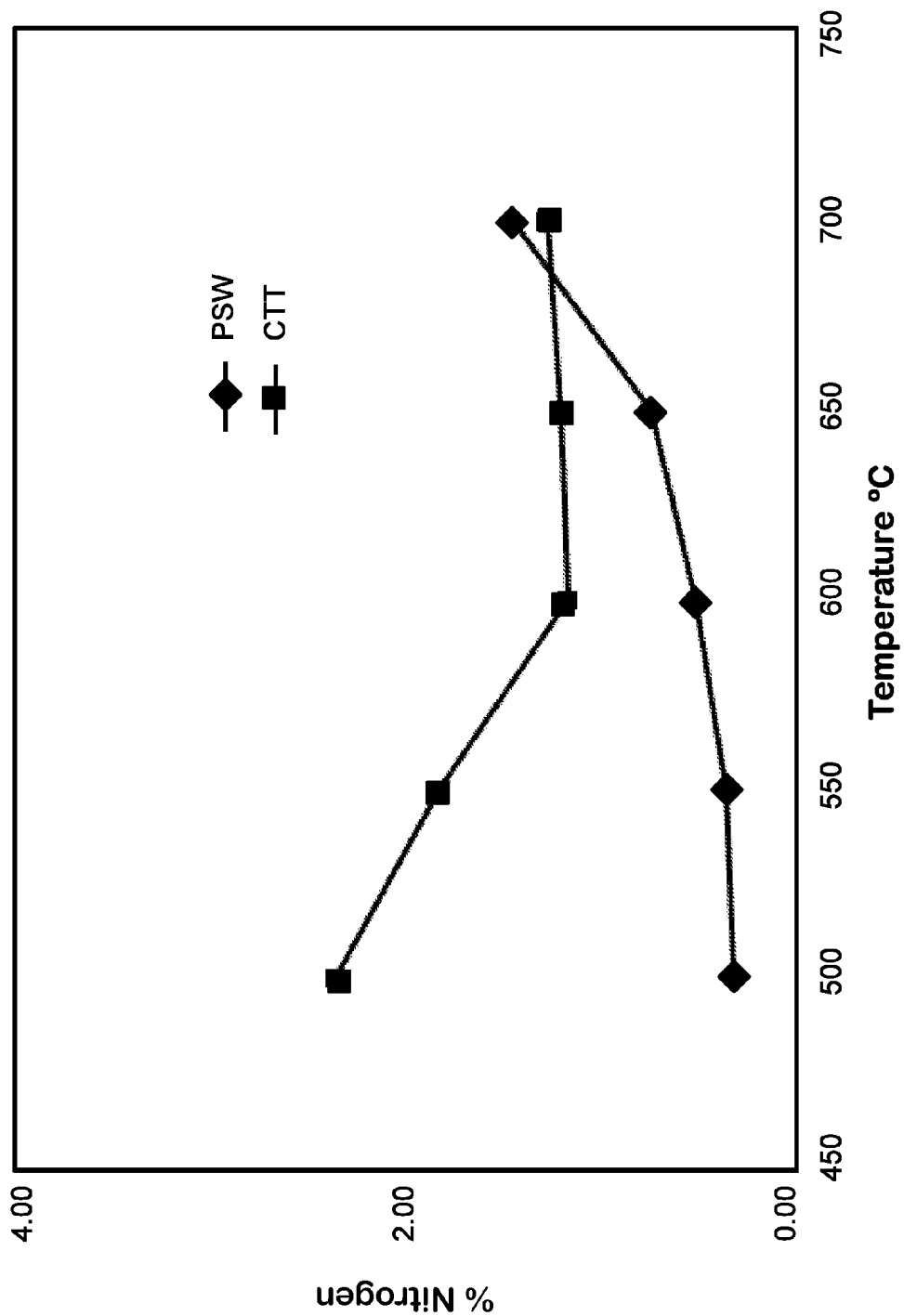
FIG. 15 depicts the nitrogen content of char after pyrolysis of two biomass sources at various temperatures.

Char samples from each experiment were collected at the end of the pyrolysis process. These samples were weighed and tested with a CHN elemental analyzer. FIGS. 13, 14, and 15 show the carbon, hydrogen, and nitrogen content, respectively, of the remaining char after pyrolysis at various temperatures. FIG. 13 shows a slight upward trend of the percentage of carbon within the remaining char as temperature increased. This increase could be due to the removal of other elements (nitrogen, oxygen, and hydrogen) at higher reaction temperatures. FIG. 14 depicts the hydrogen content of the char fraction. There was a prominent declining trend as temperature increased, with more complete removal of hydrogen at higher temperatures. FIG. 15 shows a declining trend in nitrogen content of the char from the pyrolysis of CTT as temperature increased, but an increasing trend of nitrogen from PSW.

Example 12. Results from Induction Pyrolysis with Upgrading

Figure 16:
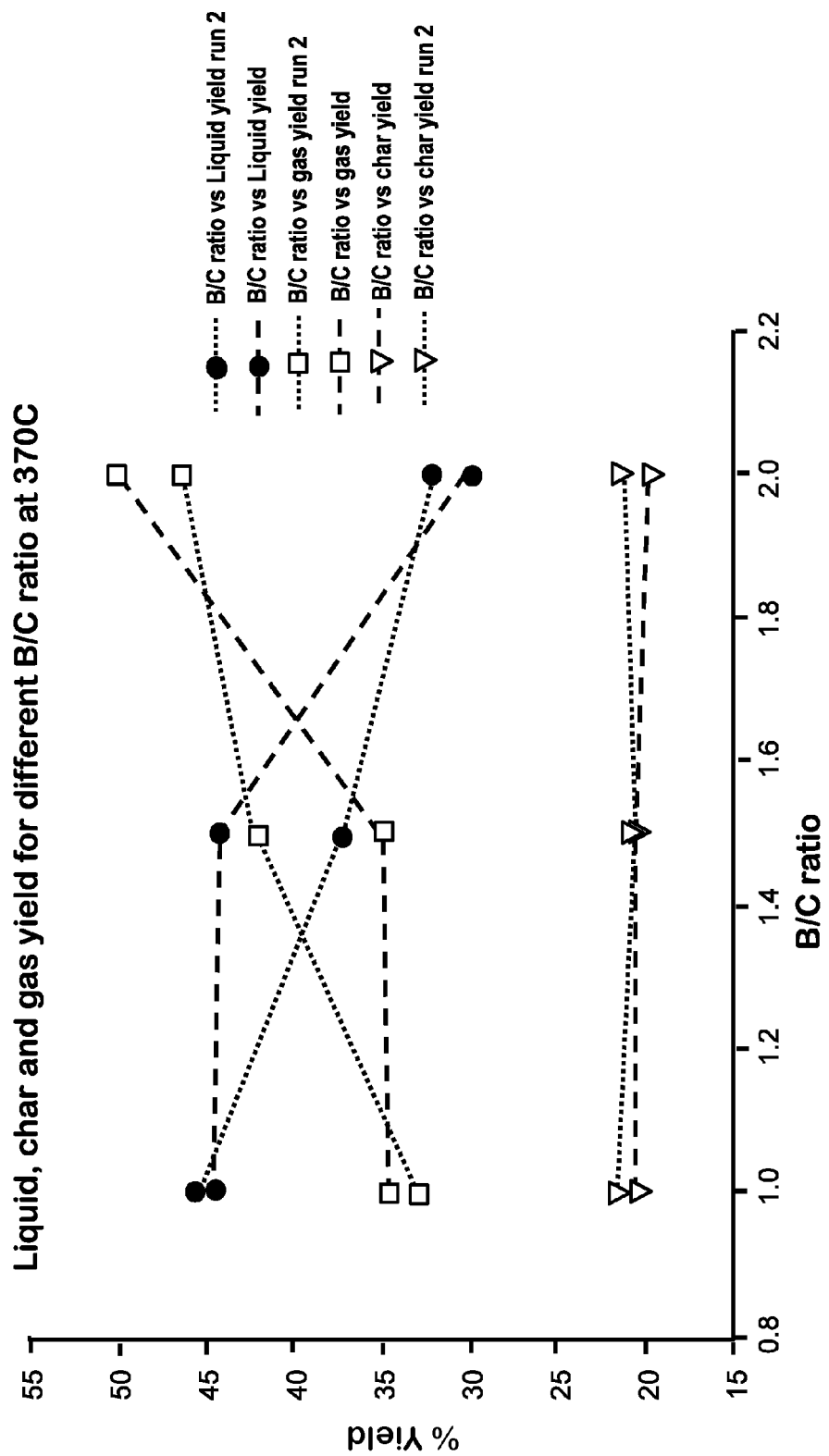
FIGS. 16, 17, and 18 depict liquid, char, and gas yields for PSW pyrolysis at various biomass-to-catalyst ratios and temperatures.
Figure 17:
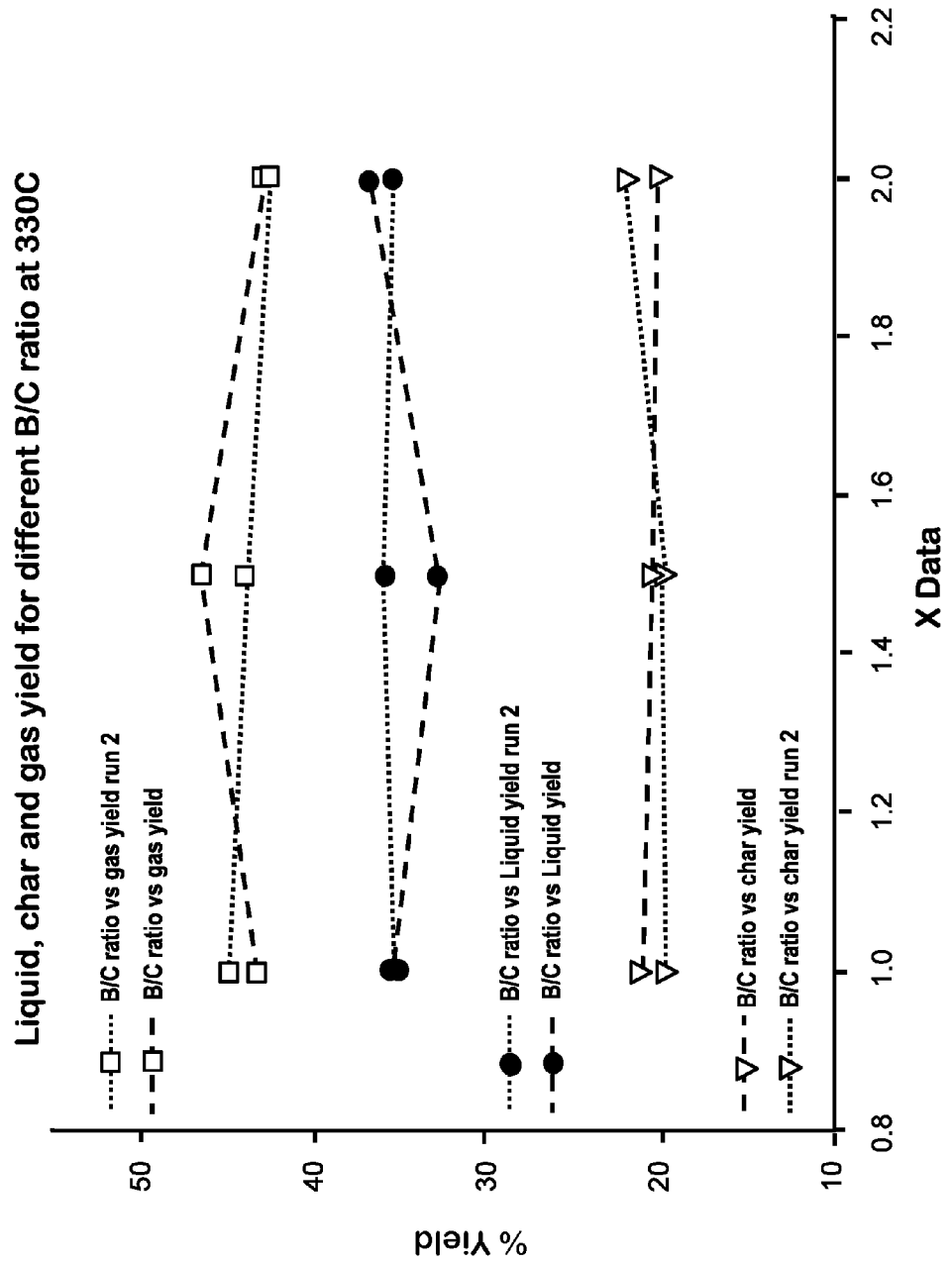
Figure 18:
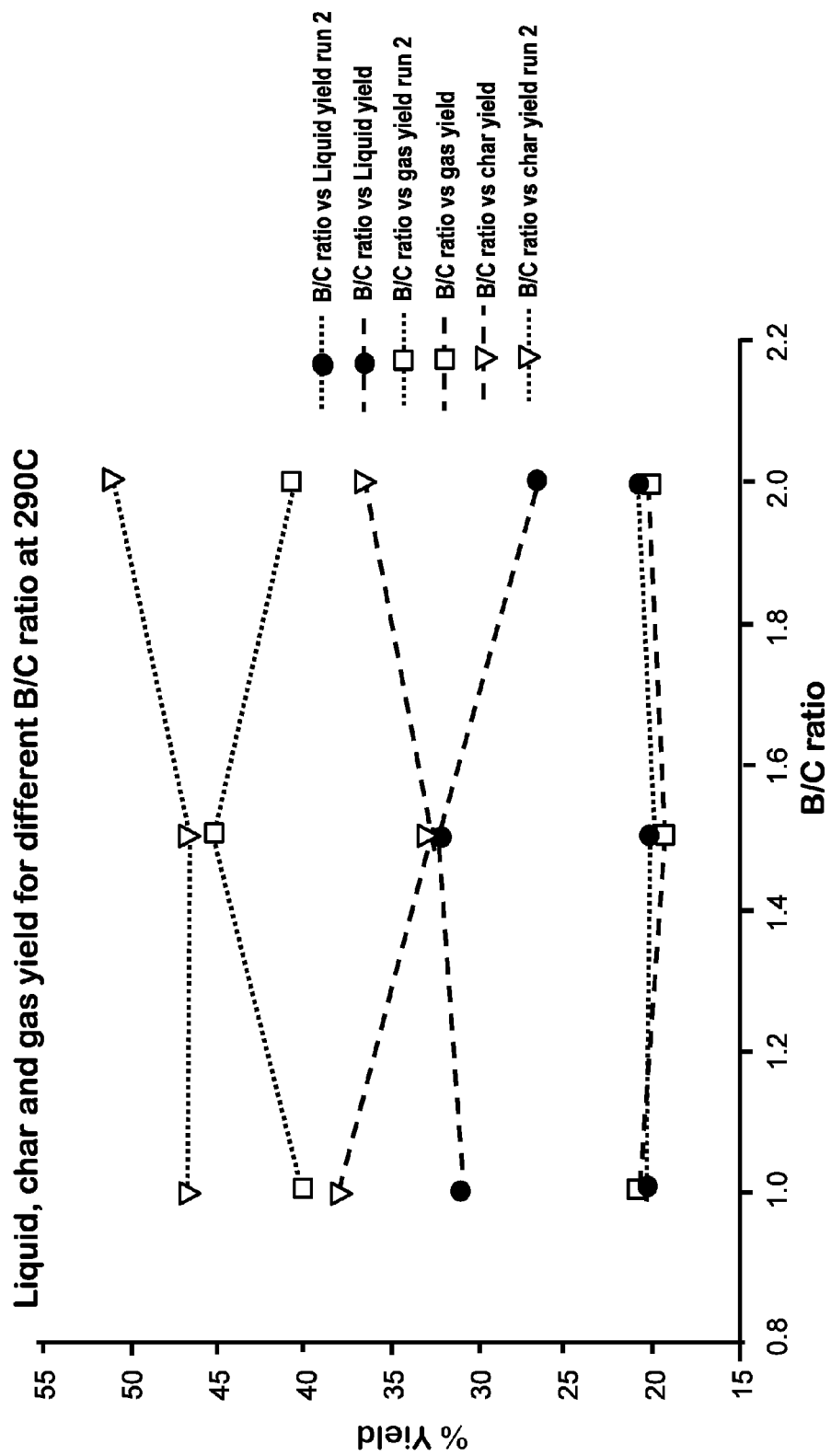

FIGS. 16, 17, and 18 show the change in liquid, char, and gas yields for PSW at three biomass-to-catalyst (B/C) ratios (1:1, 1:1.5, and 1:2) and three temperatures (370° C., 330° C., and 290° C.). The dotted lines depict the same catalyst when used in a second run at same B/C ratio and temperature combination. It was generally observed that the liquid yield decreased with catalytic upgrading. For example, the liquid yield from PSW without catalytic upgrading (50-55%) declined to 35-45% with upgrading. The highest liquid yield was achieved at the highest temperature, with a maximum yield of 45.4% at 370° C. and a B/C ratio of 1:1. The lowest liquid yield was 27% at 290° C. and a B/C ratio of 1:2. In most cases, the liquid yield increased when the same catalyst was reused for a second run, perhaps due to coke deposition on the catalyst surface, leading to partial deactivation of catalyst. Deactivated catalyst does not support the cracking reaction as well, so the liquid yield increased. Liquid yield also decreased as the B/C ratio increased at all temperatures. At higher B/C ratios, high molecular weight compounds were broken down to lower molecular weight fractions and gases. With increased B/C ratios, the gas yield tended to increase.

Figure 19:
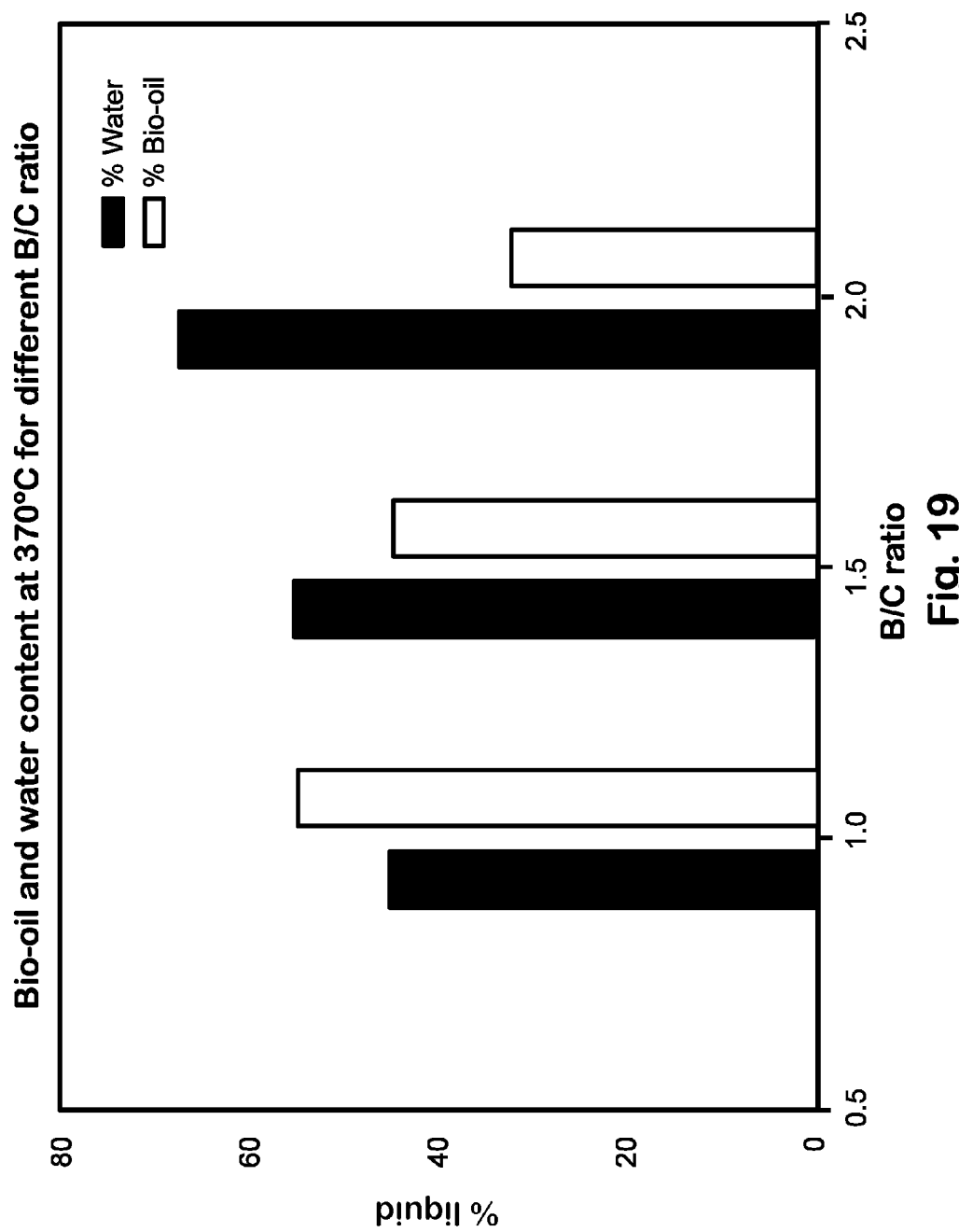
FIG. 19 depicts the water (aqueous phase) and bio-oil (non-aqueous phase) yield of pyrolysis bio-oil at different B/C ratios at 370° C.
Figure 20:
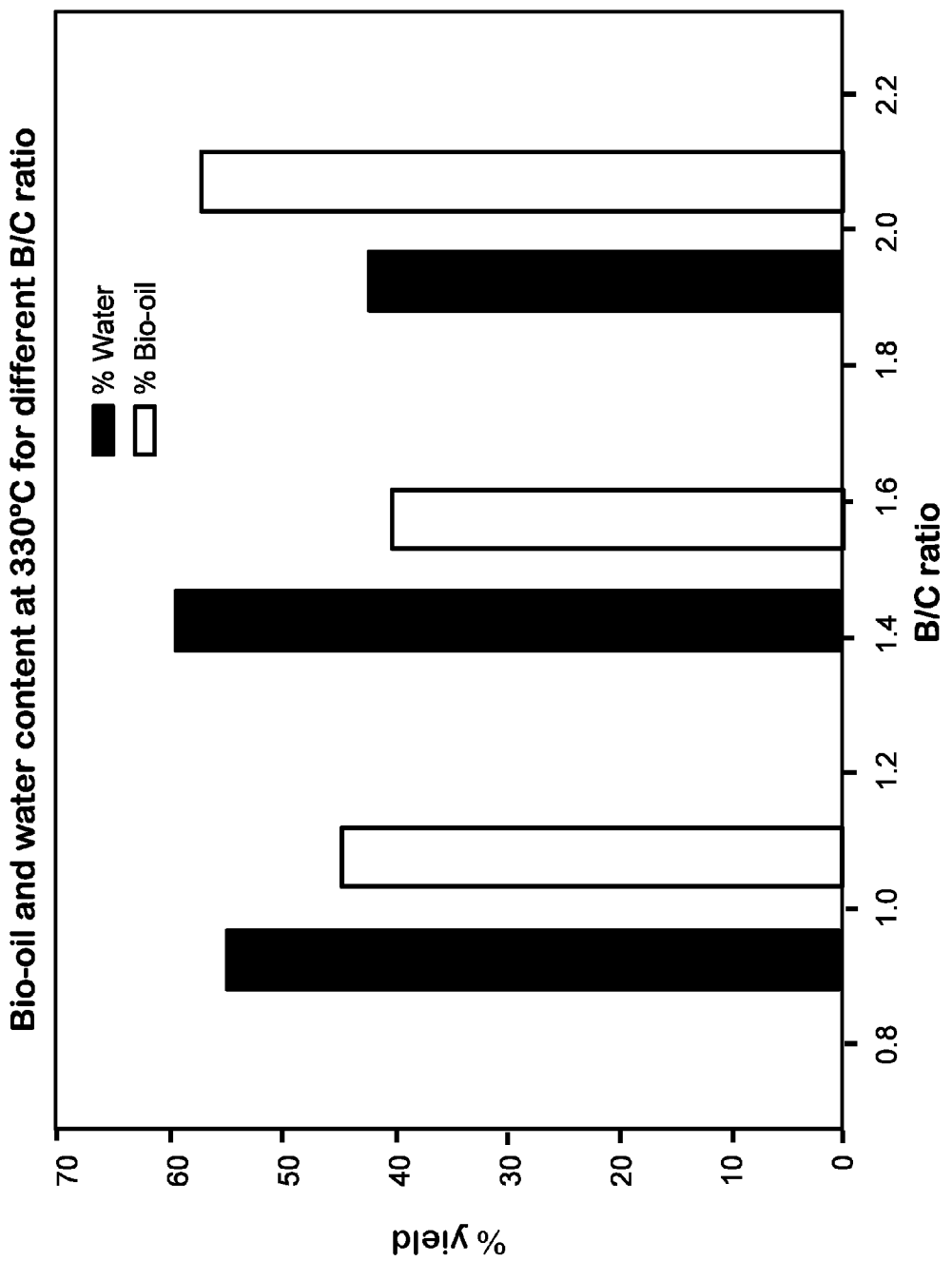
FIG. 20 depicts the water (aqueous phase) and bio-oil (non-aqueous phase) yield of pyrolysis bio-oil at different B/C ratios at 330° C.
Figure 21:
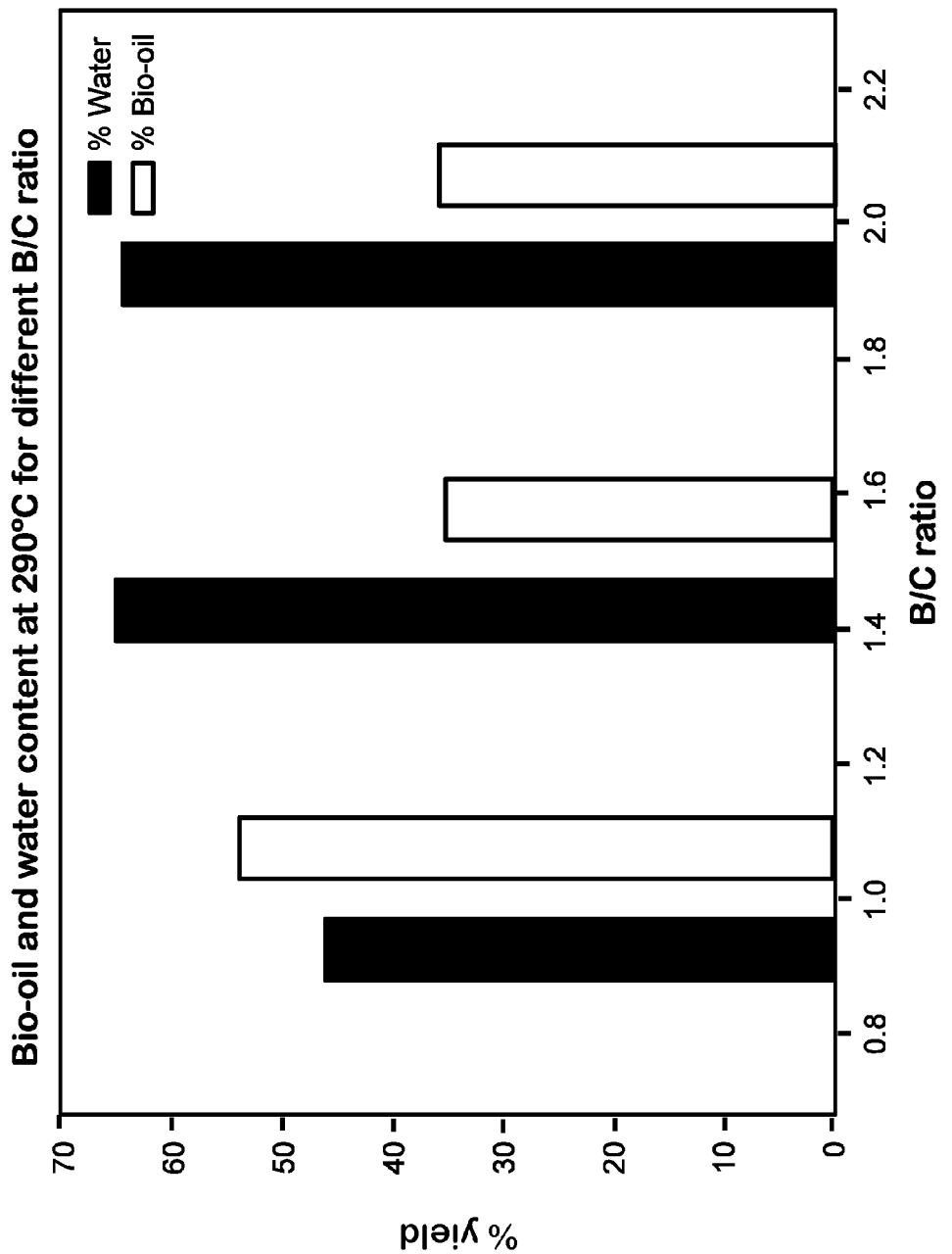
FIG. 21 depicts the water (aqueous phase) and bio-oil (non-aqueous phase) yield of pyrolysis bio-oil at different B/C ratios at 290° C.

Pyrolysis of PSW with upgrading produced ~45-65% aqueous-phase liquid, primarily comprising water, alcohols, and ketones. Catalytic upgrading removed oxygen in the form of water, carbon dioxide, and carbon monoxide. FIGS. 19, 20, and 21 show the water (aqueous phase) and bio-oil (non-aqueous phase) yields for pyrolysis at different B/C ratios and reaction temperatures (370° C., 330° C., 290° C.). The amount of water increased as the catalyst concentration increased at all temperatures, as we expected if greater amounts of oxygen were removed. No specific trend was observed across different temperature ranges.

Table 3 shows the carbon, hydrogen, and oxygen analysis of bio-oil samples. Bio-oil tends to volatize at room temperature, which made makes precise CHNO analysis difficult. Errors in weight may have led to spuriously increased oxygen values. Oxygen content decreased as the B/C ratio increased. No specific relationship was observed for temperature change.

TABLE 3

Carbon, hydrogen, and oxygen analysis of bio-oil samples.

| Temperature | B/C ratio | Carbon % | Hydrogen % | Oxygen % |
|---|---|---|---|---|
| 370 | 1 | 55.6 | 2.9 | 41.5 |
| 370 | 1.5 | 60.5 | 2.5 | 37.0 |
| 370 | 2 | 69.5 | 1.9 | 28.6 |
| 370 | 1 | 54.5 | 3.2 | 42.2 |
| 370 | 1.5 | 67.7 | 2.4 | 29.9 |
| 370 | 2 | 65.4 | 2.6 | 32.0 |
| 330 | 1 | 62.5 | 1.9 | 35.6 |
| 330 | 1 | 57.0 | 2.5 | 40.5 |
| 330 | 1.5 | 63.2 | 2.4 | 34.4 |
| 330 | 1.5 | 64.9 | 2.0 | 33.1 |
| 330 | 2 | 47.2 | 2.9 | 49.9 |
| 330 | 2 | 66.7 | 2.1 | 31.2 |
| 290 | 1 | 55.3 | 2.7 | 42.0 |
| 290 | 1 | 69.1 | 1.9 | 29.0 |
| 290 | 1.5 | 68.7 | 1.8 | 29.4 |
| 290 | 1.5 | 66.5 | 2.0 | 31.5 |
| 290 | 2 | 65.8 | 2.0 | 32.1 |
| 290 | 2 | 71.5 | 1.6 | 27.0 |

Figure 22:
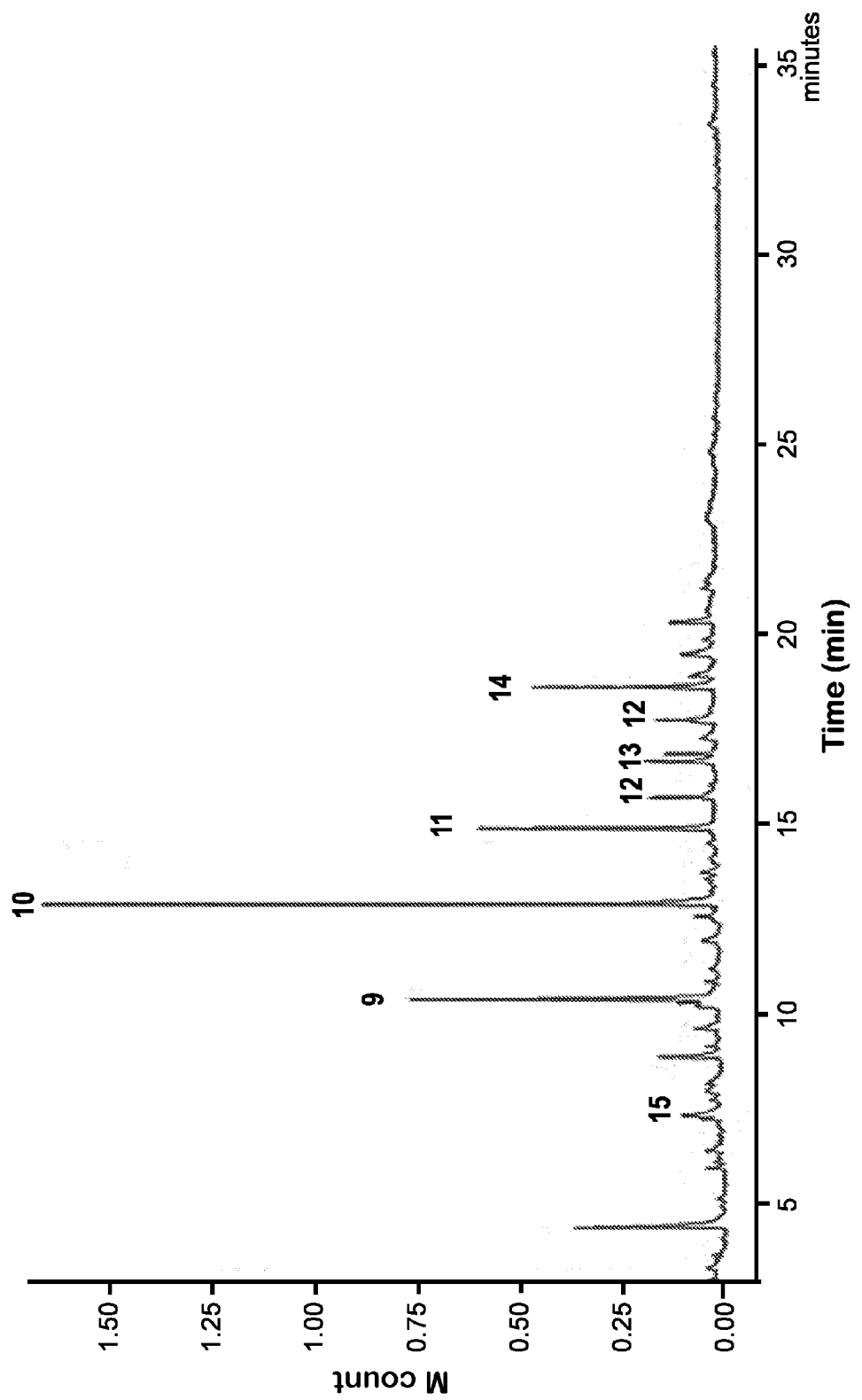
FIG. 22 depicts gas chromatograms (M count) for bio-oil samples from a non-upgraded sample (using HZSM-5).
Figure 23:
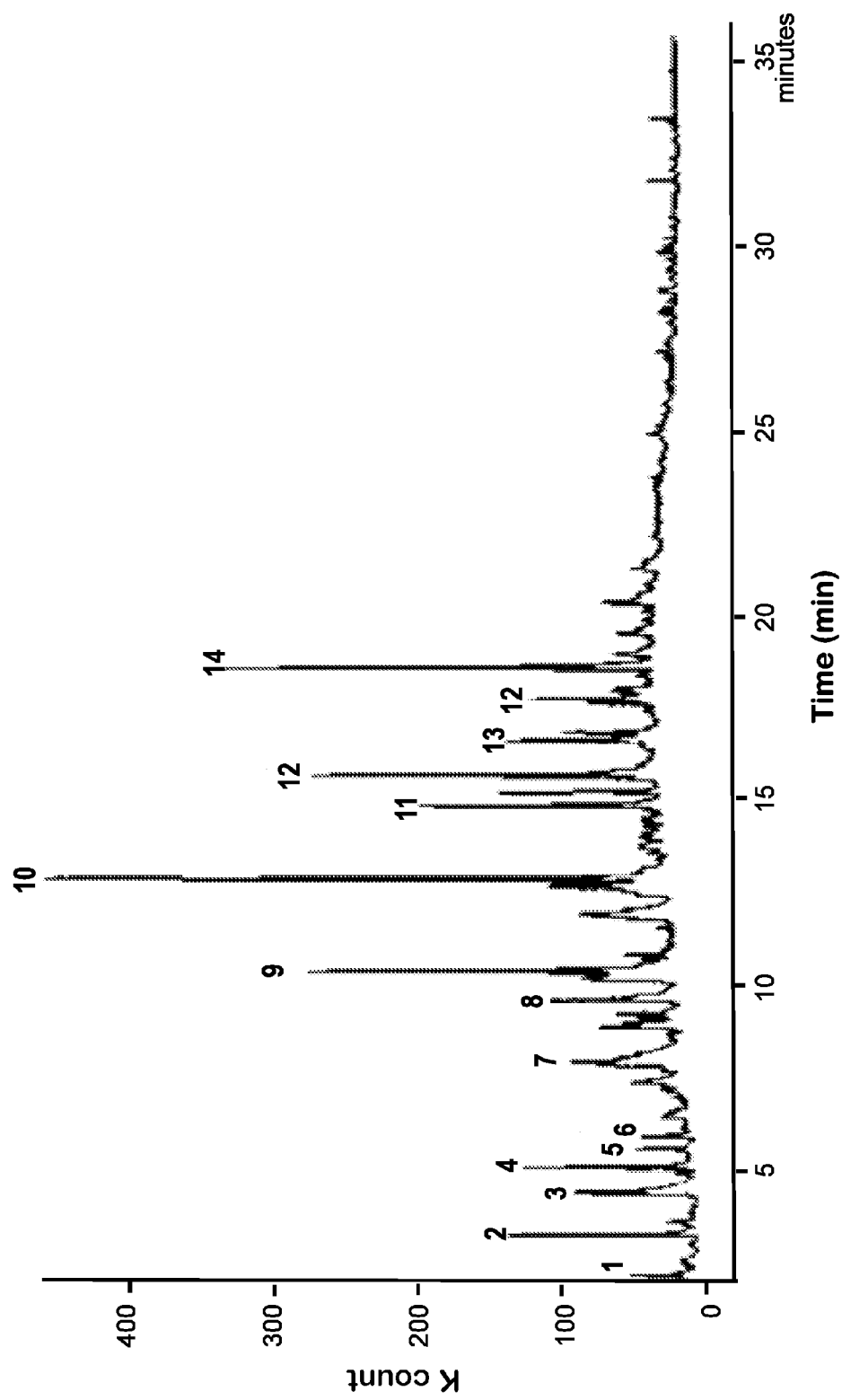
FIG. 23 depicts gas chromatograms (K count) for bio-oil samples from an upgraded sample (using HZSM-5).

FIGS. 22 and 23 show gas chromatograms for bio-oil samples from non-upgraded and upgraded samples, respectively (using HZSM-5). The presumptive compounds that correspond to the peak numbers shown in FIGS. 22 and 23 are listed in Table 4. Bio-oil vapors were upgraded over an HZSM-5 catalyst in an induction heater at 370° C. PSW was pyrolyzed at 550° C. for 45 min for both upgraded and non-upgraded samples. The upgraded samples had high concentrations of BTEX compounds, and lower concentrations of phenols and mequinol. Non-upgraded bio-oil contained almost no BTEX compounds, and was primarily composed of phenols. The peak area for phenols was lower for upgraded bio-oil, suggesting that catalysis had increased deoxygenation reactions. Various catalyst amounts, operating temperatures, and flow rates will be tested to determine optimal conditions to favor BTEX formation.

TABLE 4

Compounds corresponding to the numbered peaks in FIGS. 22 and 23.

| Peak No. | Compound Name |
|---|---|
| 1 | Benzene |
| 2 | Toluene |
| 3 | 3-methyl-furan |
| 4 | Ethylbenzene |
| 5 | o-xylene |
| 6 | 2 cyclopenten-1-one |

TABLE 4-continued

Compounds corresponding to the numbered peaks in FIGS. 22 and 23.

| Peak No. | Compound Name |
|---|---|
| 7 | 1,2,3 trimethylbenzene |
| 8 | 1-ethynyl-4-methylbenzene |
| 9 | Mequinol |
| 10 | 2-methoxy-4-methylphenol |
| 11 | 4-ethyl-1,3-methylphenol |
| 12 | 4-ethyl-1,3-methylphenol |
| 13 | Eugenol |
| 14 | 1,2-methoxy-4-(1-propyl)-phenol |
| 15 | Furan |

Example 13. Results from Microwave Pyrolysis

Similar experiments and analyses will be conducted with microwave pyrolysis. Results are expected to be broadly similar, although not identical, to those for induction-heating pyrolysis.

The complete disclosures of all references cited in this specification are hereby incorporated by reference in their entirety, as are the complete disclosures of the three priority applications: U.S. provisional applications Ser. No. 61/838,565, 61/839,081, and 62/013,020; as well as the complete disclosures of all references cited in the priority applications. In the event of an otherwise irresolvable conflict, however, the disclosure of the present specification shall control.

What is claimed:

1. A method of making a catalyst/support composition; said method comprising the steps of:
   (a) cleaning the surface of one or more metallic substrate particles, wherein each metallic substrate particle has a longest dimension between about 100 μm and about 5 mm;
   (b) oxidizing or nitriding the surfaces of the metallic substrate particles, to covalently attach oxide or nitride groups to the surfaces of the metallic substrate particles;
   (c) covalently bonding one or more linker groups to the oxide, to the nitride, or to the metal surface;
   (d) covalently bonding one or more seed layers to the one or more linker groups, wherein the one or more seed layers comprise ruthenium, rhodium, palladium, silver, osmium, iridium, platinum, gold, copper, rhenium, mercury, aluminum oxide, or nickel(II) oxide;
   (e) covalently bonding a catalyst layer to the one or more seed layers, wherein the catalyst layer comprises a metal, a metal oxide, a doped metal, or a zeolite;
   wherein:
   the resulting catalyst/support composition is adapted to directly absorb electromagnetic energy from microwave irradiation, or electromagnetic induction, or both; and thereby to be rapidly heated to a temperature between about 250° C. and about 1000° C.

2. The method of claim 1, additionally comprising heating the catalyst/support composition to a temperature between about 250° C. and about 1000° C. in an inert atmosphere, wherein the stability of the catalyst is enhanced by said heating.

3. The method of claim 1, additionally comprising catalyzing the formation of bio-oil from biomass over the resulting catalyst/support composition at a temperature between about 250° C. and about 1000° C.

4. A method of producing bio-oil from biomass; said method comprising making a catalyst/support composition by the method of claim 1; and additionally comprising the steps of:
   (a) heating the catalyst/support composition to a temperature between about 250° C. and about 1000° C. by microwave irradiation, or by electromagnetic induction, or both, in an inert atmosphere inside a reactor;
   (b) contacting biomass with the heated catalyst/support composition for a time sufficient to transform at least a portion of the biomass into bio-oil vapors; wherein the catalyst/support composition is hotter than the biomass; and
   (c) condensing the bio-oil vapors, and collecting the resulting bio-oil liquid.

5. The method of claim 4, wherein said contacting step is conducted as a continuous process.

6. The method of claim 4, wherein said contacting step is conducted as a batch process.

7. The catalyst/support composition produced by the method of claim 1.

* * * * *